Fig. 3

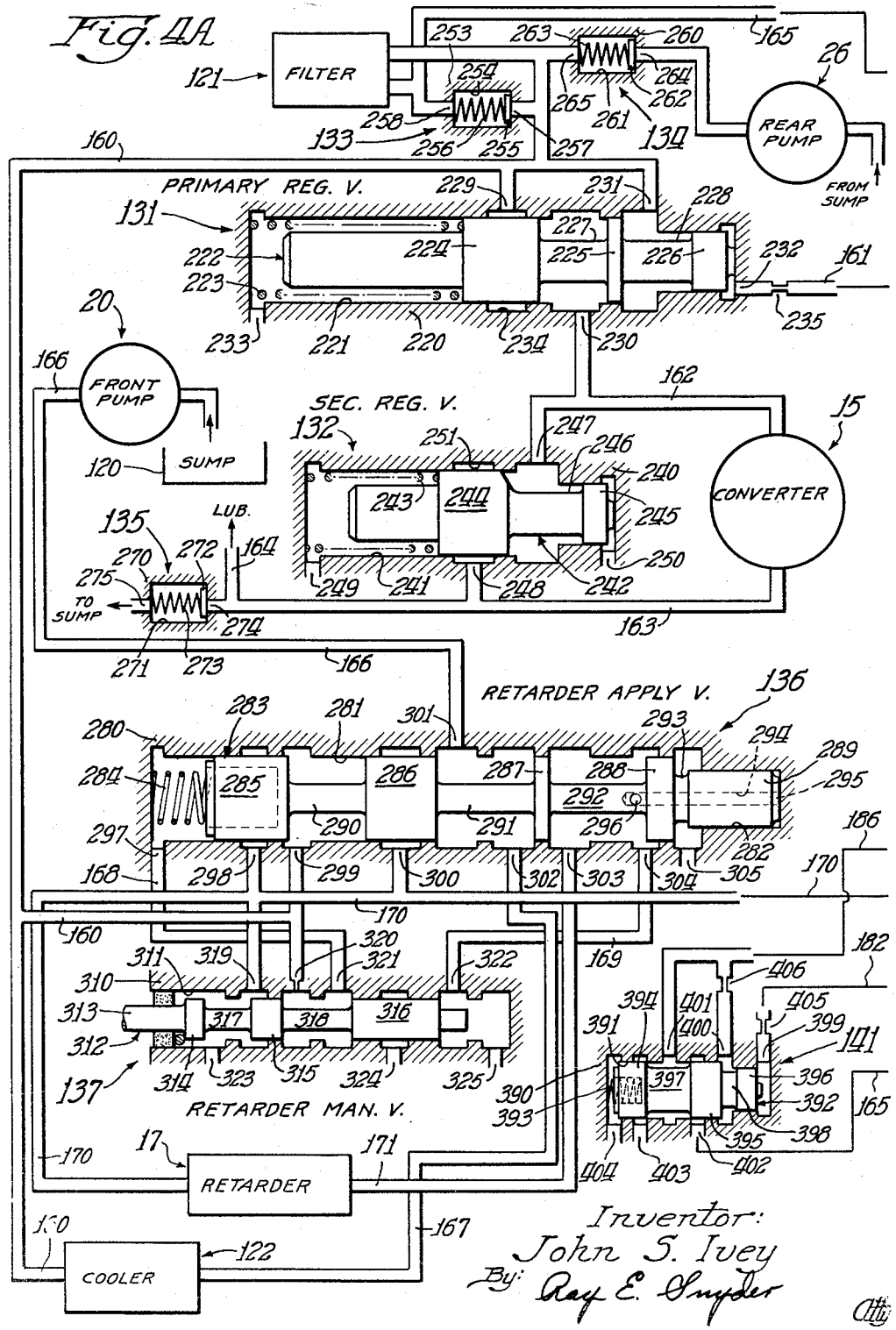

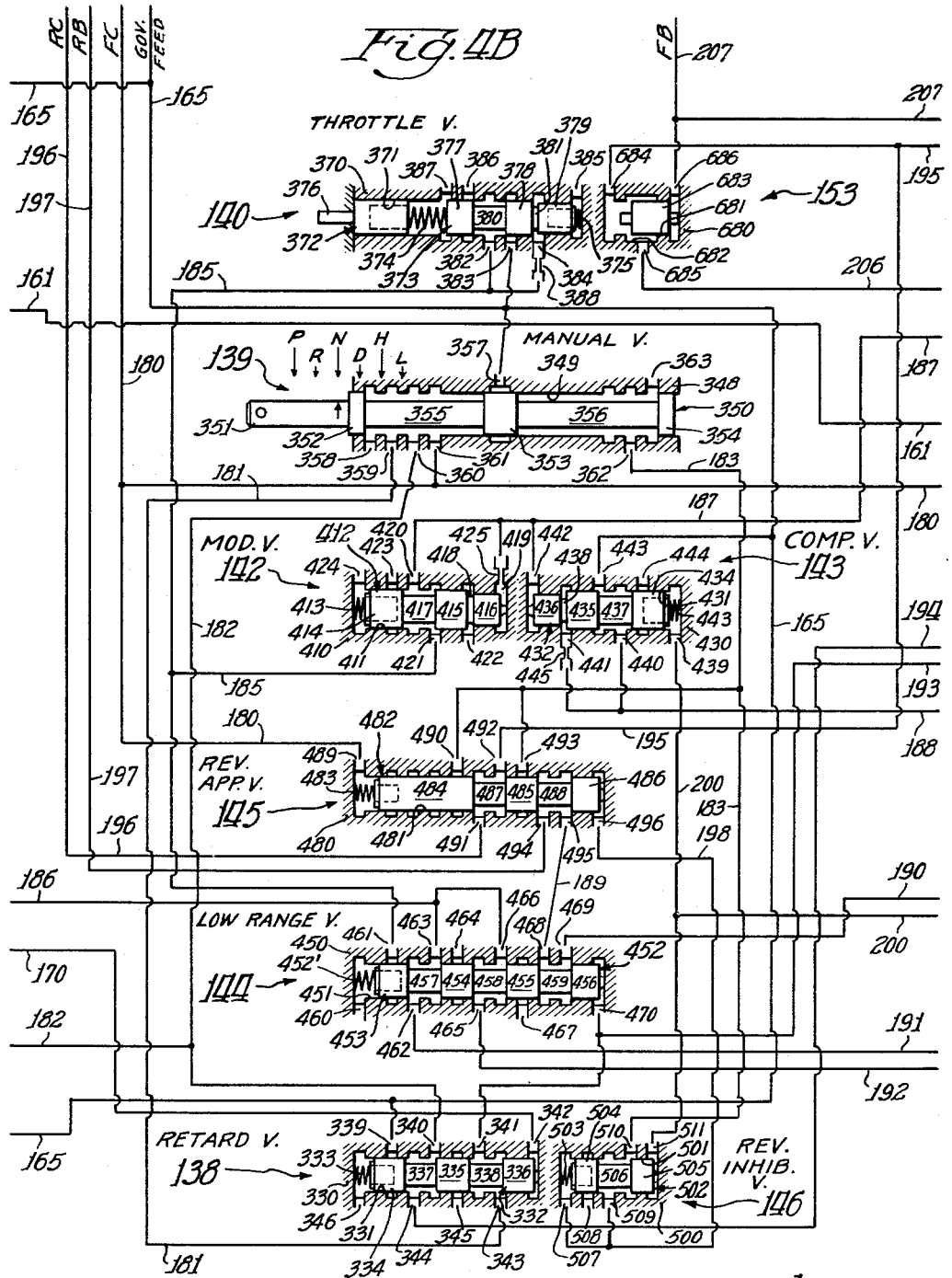

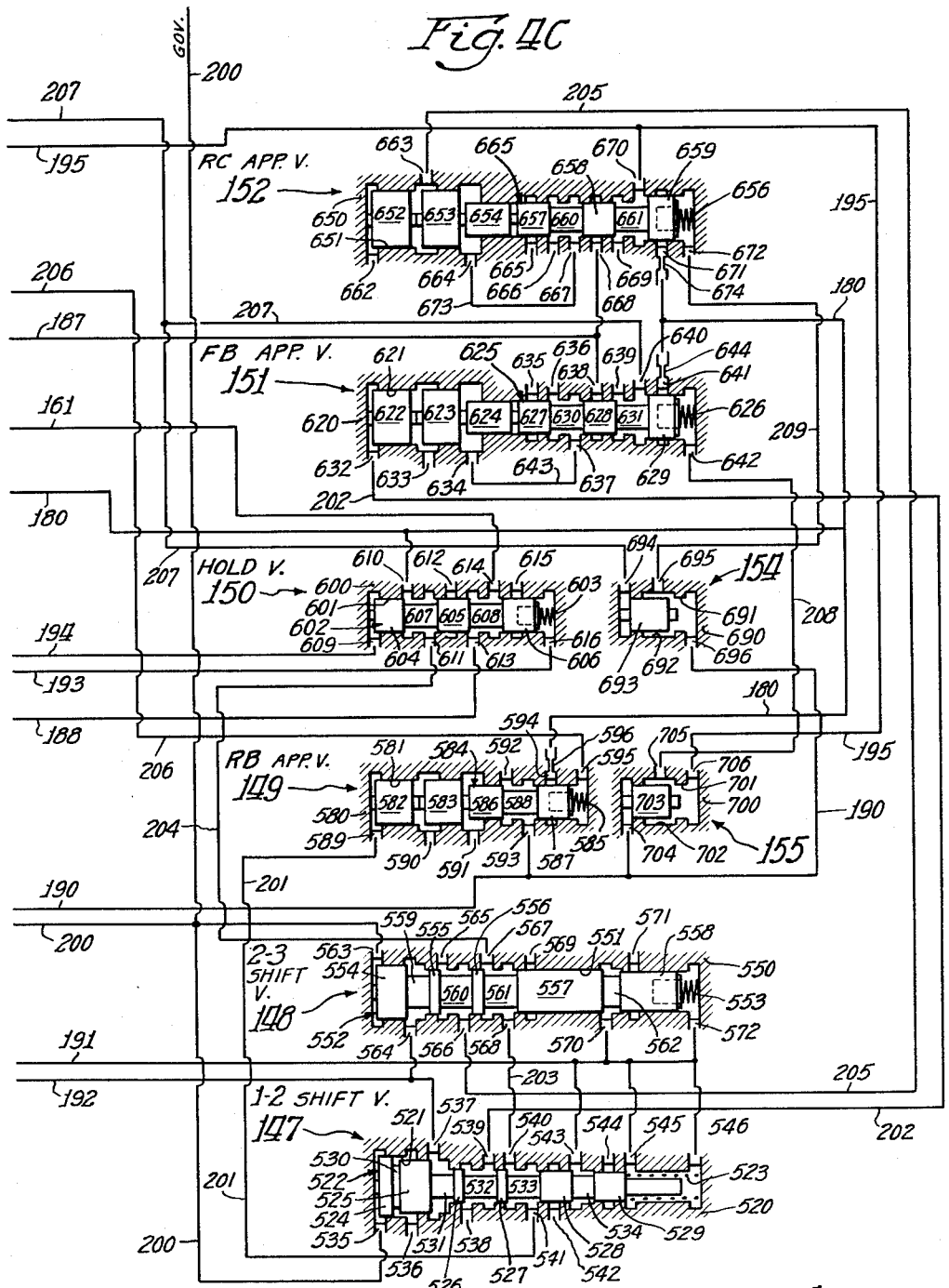

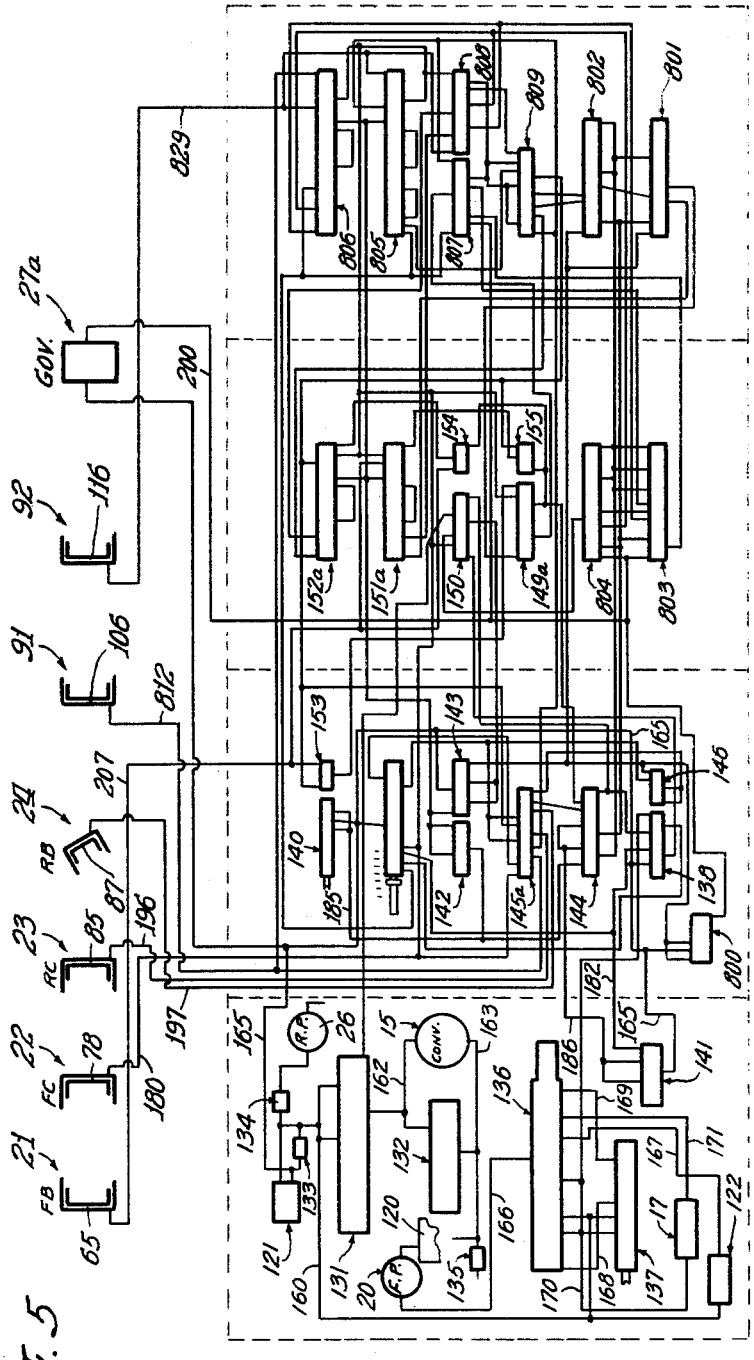

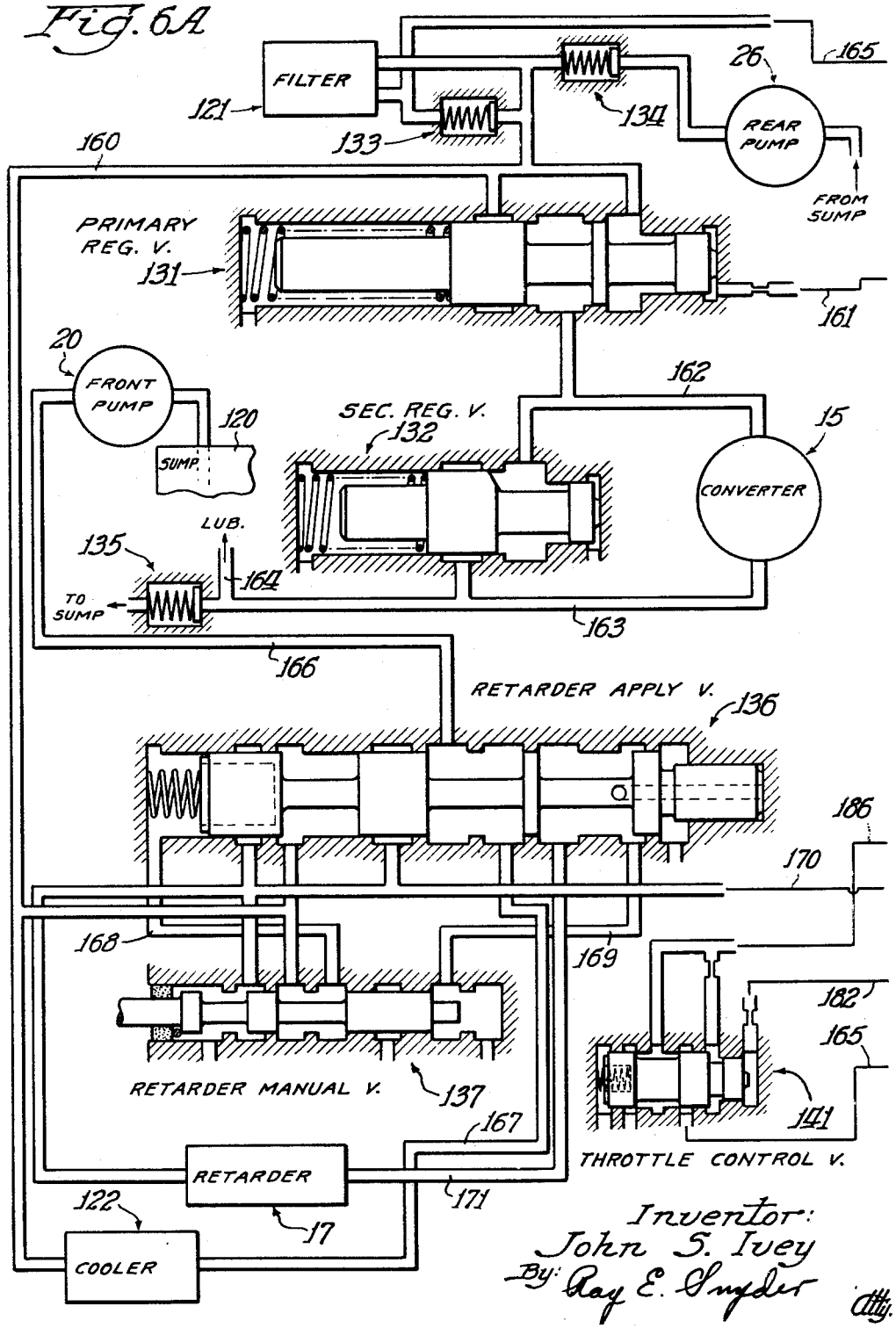

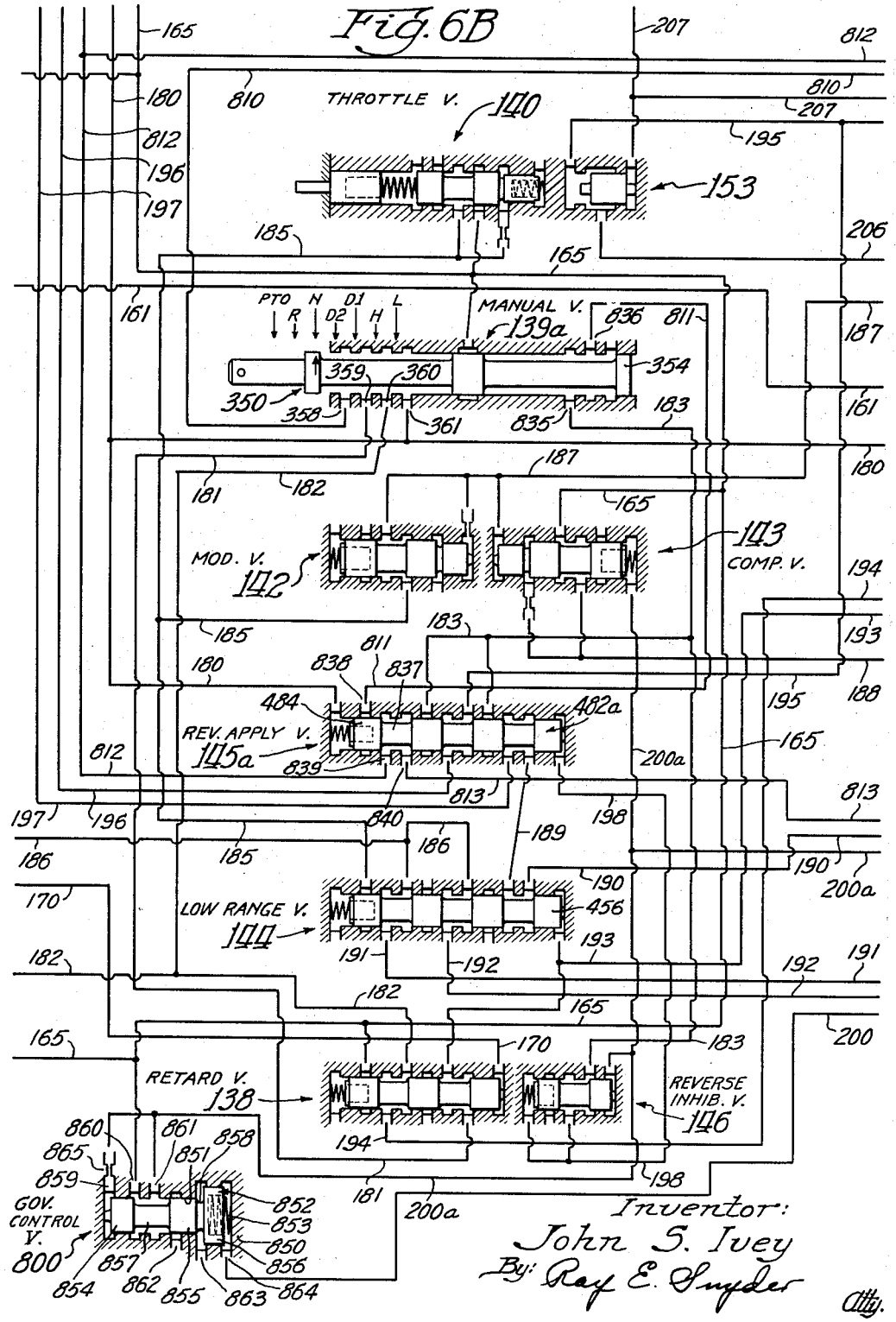

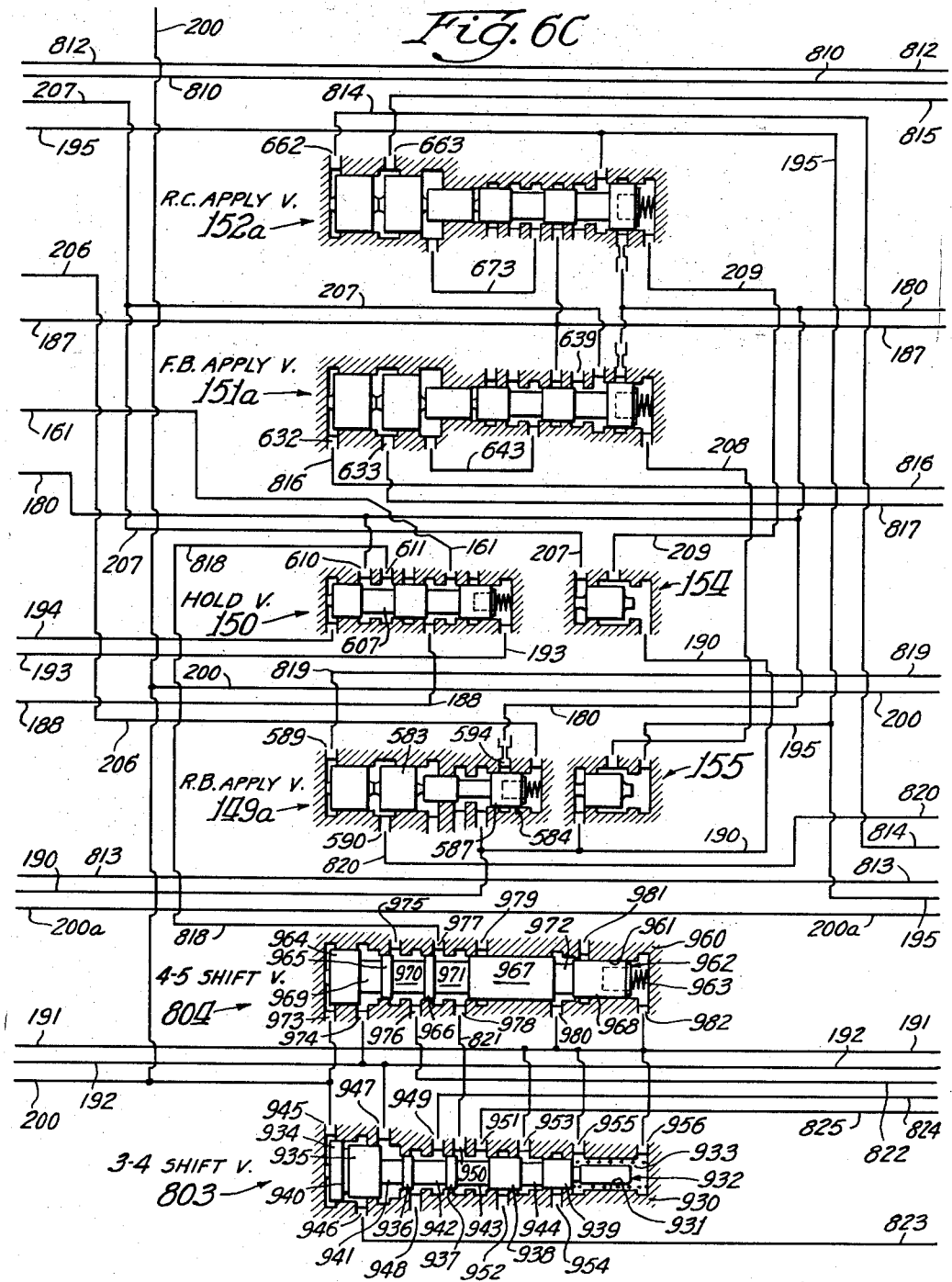

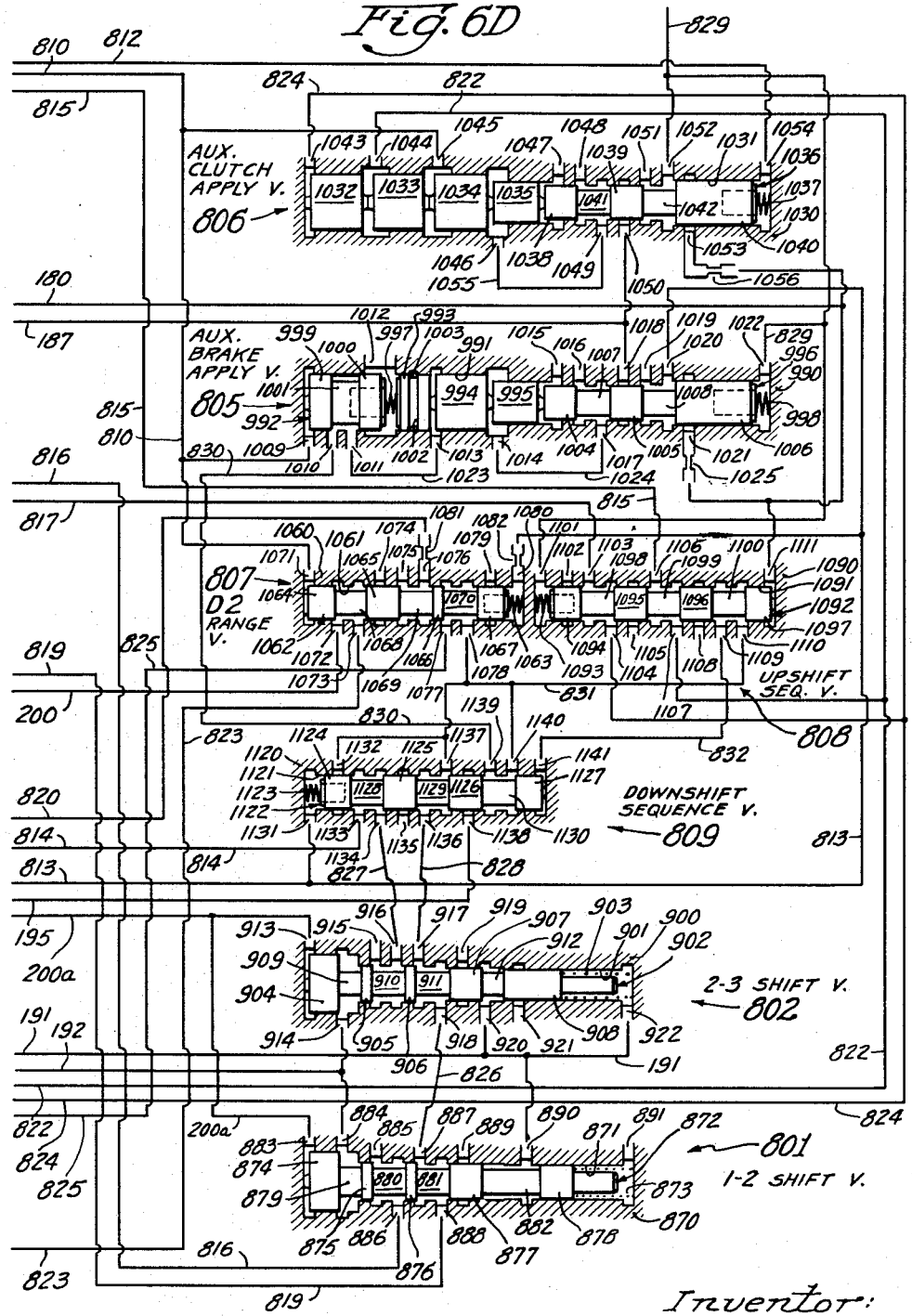

United States Patent Office 3,146,630
Patented Sept. 1, 1964

3,146,630
TRANSMISSION MECHANISM
John S. Ivey, Muncie, Ind., assignor to Borg-Warner Corporation, Chicago, Ill., a corporation of Illinois
Filed Aug. 31, 1961, Ser. No. 135,265
11 Claims. (Cl. 74—472)

This invention relates to an automatic transmission including a multiple speed gear box, a fluid torque converter and a fluid retarder and primarily adapted for use in large automotive vehicles such as trucks or tractors.

It is an object of the present invention to provide an improved automatic transmission and control system therefor and including a fluid torque converter and a multi-ratio planetary gear set in combination with a hydraulic retarder for providing a plurality of forward drive speed ratios and a drive in reverse.

It is another object to provide improved hydraulic controls for controlling the establishment of the various driving gear ratios through the transmission and incorporating valve means effective to hold the transmission in a particular gear ratio regardless of changes in vehicle speed or throttle actuator position.

It is another object to provide a transmission of the type described and including a plurality of fluid pressure actuated servomotors for establishing the various driving gear ratios through the transmission, a source of fluid pressure for supplying fluid to the servomotors, a hydraulic retarder that is filled with fluid from said source, and valve means for controlling the rate of fill of the retarder so as to limit the drop in fluid pressure supplied to the servomotors while the retarder is being filled and which is effective upon the attainment of some predetermined pressure within the retarder to allow relatively unrestricted flow of fluid through the retarder.

It is another object to provide an improved hydraulic control system for a transmission having a multi-speed gear set interconnected with a hydraulic retarder and in which a hold valve is employed that is interconnected with the retarder fluid circuit and is effective to hold the transmission in the gear ratio being used at the time the retarder is applied.

It is still another object to provide an improved hydraulic control system for a transmission including a source of fluid pressure, a pressure regulating valve for regulating the fluid pressure supplied to the control system, and a hold valve that is operable when actuated to hold the transmission in the particular gear ratio then in use and is also effective to cause the pressure regulator valve to regulate the pressure supplied from said source at a substantially higher value than when the hold valve is not actuated.

It is still another object to provide an improved multi-speed transmission and control system therefore including a plurality of fluid pressure actuated servomotors for establishing the various driving gear ratios through the transmission, an apply valve for each of the servomotors for controlling the actuation thereof, shift valve means responsive to vehicle speed and vehicle throttle actuator position and effective to supply signal pressures to the apply valves for causing the actuation of the respective servomotors, and said apply valves comprising valve pistons formed with a differential area responsive to the fluid pressure supplied to the respective servomotor and effective to hold the servomotor in an applied condition until a counteracting signal is obtained from one of said shift valves.

It is still another object to provide an improved control system for a multi-speed transmission including a plurality of fluid pressure actuated servomotors for establishing the various driving gear ratios through the transmission, a source of fluid pressure for actuating the servomotors, and a plurality of shift valves which are effective to direct fluid pressure to the respective servomotors, said shift valves being connected in series so that fluid from said source passes through each of the shift valves in order from the highest speed ratio to the lowest speed ratio so that a shift valve controlling a higher speed ratio when actuated controls the operation of all of the shift valves for the lower speed ratios whereby not more than one gear ratio can be established through the transmission at any one time.

The invention consists of the novel constructions, arrangements and devices to be hereinafter described and claimed for carrying out the above stated objects and such other objects as will appear from the following description of preferred forms of the invention, illustrated with reference to the accompanying drawings, wherein:

FIG. 3 is a schematic diagram of the hydraulic control circuit to be used with the transmission of FIG. 1;

FIG. 4 is a layout diagram of FIGS. 4A, 4B, and 4C, illustrating an enlarged schematic diagram of the control circuit of FIG. 3;

FIG. 5 is a schematic diagram of the hydraulic control circuit to be used with the transmission of FIG. 2;

FIG. 6 is a layout diagram of FIGS. 6A, 6B, 6C, and 6D, illustrating an enlarged schematic diagram of the control circuit of FIG. 5; and FIG. 7 is an enlarged cross-sectional view of the governor valve to be used with the controls of FIGS. 3 and 5.

Like characters of reference designate like parts in the several views.

Figure 1:
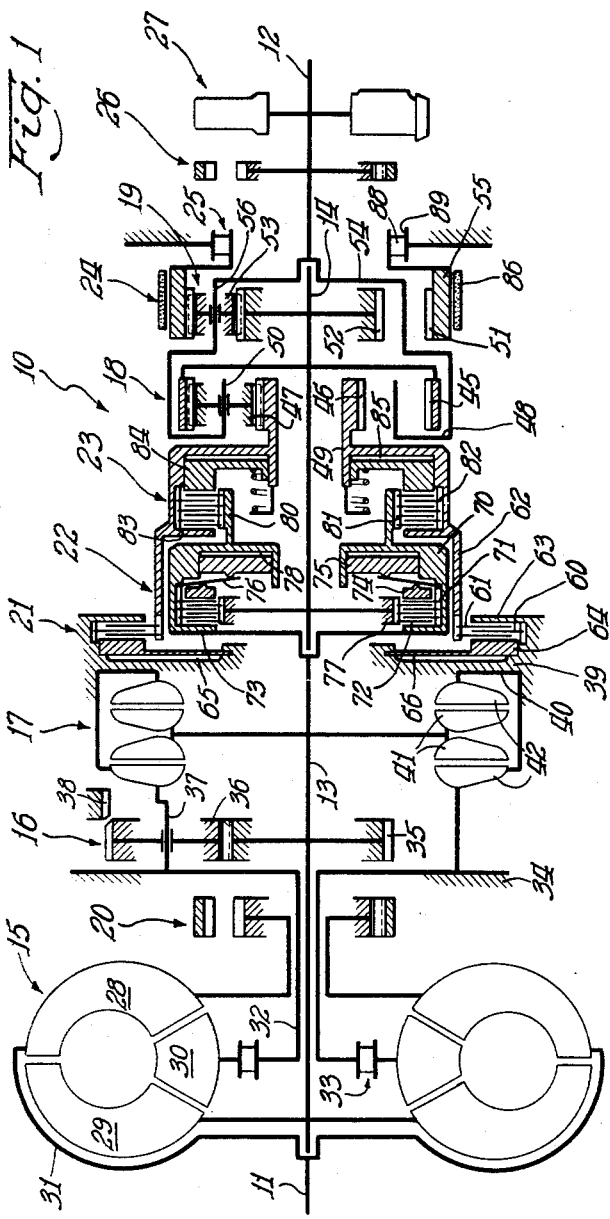
FIG. 1 is a longitudinal schematic drawing of the transmission of the present invention capable of providing three forward drive speed ratios.

Referring to FIG. 1, there is illustrated a transmission mechanism designated generally by the numeral 10 and comprising an input shaft 11, an output shaft 12, first and second intermediate shafts 13 and 14, a hydraulic torque converter 15, a power take-off unit 16, a hydraulic retarder 17, a front planetary gear set 18, and a rear planetary gear set 19. The transmission mechanism 10 also includes an engine driven front pump 20 for supplying fluid pressure to the hydraulic controls for the transmission, a disc type front brake 21, a front clutch 22, a rear clutch 23, a rear band brake 24, a one-way brake 25, a rear pump 26 driven by the output shaft 12, and a governor 27 also driven by the output shaft 12.

The input shaft 11 is connected to a driving engine (not shown), and the output shaft 12 is connected by suitable means to the driving road wheels of the vehicle (not shown). The torque converter 15 comprises a bladed driving element or impeller 28, a bladed driven element or turbine 29, and a bladed stator or reaction element 30. The impeller 28 is connected to the input shaft 11 by means of a shroud 31; the turbine 29 is connected to the first intermediate shaft 13; and the stator 30 is connected to a sleeve shaft 32 through a one-way brake 33. The sleeve shaft 32 is anchored to a casing or housing 34 for the transmission 10.

The power take-off unit 16 comprises a gear 35 splined to the intermediate shaft 13, an idler gear 36 mounted on a countershaft 37, and a sliding power take-off pinion 38. The idler gear 36 is in mesh with the gear 35 and rotates about the shaft 37 which is anchored to the casing 34. The sliding gear 38 is moved axially into engagement with the idler gear 36 by any suitable means (not shown) whenever it is desired to take auxiliary power from the transmission.

The hydraulic retarder 17 comprises a housing portion 39 formed with an internal cavity 40, a plurality of rotattable vanes 41 are attached to the intermediate shaft 13, and a plurality of stationary vanes 42 are mounted within the cavity 40. The hydraulic retarder 17 is operable to absorb kinetic energy whenever the cavity 40 is filled with fluid.

The front planetary gear set 18 comprises a ring gear 45, a sun gear 46, a plurality of planet gears 47, and a planet gear carrier 48. The ring gear 45 is connected to the second intermediate shaft 14, and the sun gear 46 is formed on a sleeve shaft 49 which is journalled on the intermediate shaft 14. The planet gears 47 are in mesh with both the ring gear 45 and the sun gear 46 and are rotatably mounted on pins 50 carried by the planet gear carrier 48.

The rear planetary gear set 19 comprises a ring gear 51, a sun gear 52, a plurality of planet gears 53, and a planet gear carrier 54. The ring gear 51 is formed on the interior of a drum 55 which is connectible through the one-way brake 25 to the casing 34. The sun gear 52 is splined directly to the intermediate shaft 14. The planet gears 53 are in mesh with both the ring gear 51 and sun gear 52 and are rotatably mounted on pins 56 carried by the planet gear carrier 54. The planet gear carrier 54 is connected to both the output shaft 12 and the planet gear carrier 48 of the front gear set 18.

The front brake 21 comprises a plurality of annular friction discs 60 splined within an annular portion of the casing 34, a plurality of friction discs 61 interleaved with the discs 60 and splined on the exterior of a drum member 62, a fixed pressure plate 63 mounted within the casing 34, and an annular piston and pressure plate 64. The piston 64 is slidably disposed within an annular cavity 65 which is adapted to be filled with fluid under pressure for engaging the brake 21. The pressure plate 64 is carried by a flexible annular disc 66 which functions as a wall for the cavity 65 and as a return spring for disengaging the brake 21.

The front clutch 22 comprises an annular drum or casing 70, a plurality of friction discs 71 splined within the casing 70, a plurality of friction discs 72, a fixed pressure plate 73, a movable pressure plate 74, an annular piston 75, and a Belleville type spring washer 76. The casing 70 is connected directly to the first intermediate shaft 13 and is journalled on the second intermediate shaft 14. The friction discs 72 are splined to an annular hub 77 which is splined to the intermediate shaft 14. The discs 72 are interleaved with the discs 71 between the fixed pressure plate 73 and the movable pressure plate 74. The piston 75 is slidably disposed within an annular cavity 78 formed in the casing 70 which is adapted to be filled with fluid under pressure for engaging the clutch 22. When the piston 75 is hydraulically actuated, the Belleville washer 76 acts as a lever between the piston 75 and the movable pressure plate 74 for forcing the discs 71 and 72 into engagement. The washer 76 also acts as a return spring for disengaging the clutch 22.

The rear clutch 23 comprises the drum member 62, an annular flange 80 formed integrally with the drum 70, a plurality of friction discs 81 splined to the outer periphery of the flange 80, a plurality of friction discs 82 splined to the interior of the drum 62, a fixed end pressure plate 83 mounted within the drum 62, and an annular piston and pressure plate 84. The piston 84 is slidably disposed within an annular cavity 85 formed in the drum 62. The cavity 85 is adapted to be filled with fluid under pressure for engaging the rear clutch 23.

The rear brake 24 comprises a band 86 adapted to engage the outer periphery of the drum 55 and a fluid pressure actuated servo motor 87 (see FIG. 3) for applying the band 86.

The one-way brake 25 comprises a plurality of tiltable sprags 88 disposed between an inner race formed on the drum 55 and an outer race 89 formed within the casing 34.

In operation, the transmission mechanism 10 has as a neutral condition, provides three forward drive speed ratios in automatic operation, and a reverse drive.

In neutral condition, all of the brakes and clutches 21–25 are disengaged and no power train is established between the drive shaft 11 and driven shaft 12.

Low speed forward drive is obtained by engagement of the front clutch 22 and the one-way brake 25. For this condition, driving torque is transmitted from the drive shaft 11 through the hydraulic torque converter 15, intermediate shaft 13, clutch 22, second intermediate shaft 14, sun gear 52, planet gears 53, and planet gear carrier 54 to the output shaft 12. The one-way brake 25 functions to hold the ring gear 51 stationary which serves as a reaction element for the planetary gear set 19. Both the front brake 21 and rear clutch 23 are disengaged so that the elements of the front planetary gear set 18 rotate freely.

An alternate low speed forward drive is obtained by engagement of the rear brake 24 which functions to hold stationary the ring gear 51 in the same manner as the one-way brake 25.

Second or intermediate speed forward drive is obtained by engagement of the front brake 21 and the one-way brake 25 overruns. The front clutch 22 remains engaged for all of the forward speed drive ratios. For this condition, driving torque is transmitted as before from the drive shaft 11 through the hydraulic torque converter 15, intermediate shaft 13, front clutch 22, and intermediate shaft 14 to the sun gear 52 of the rear planetary gear set 19 and also to the ring gear 45 of the front planetary gear set 18. The sun gear 46 of the front planetary gear set 18 is held stationary by means of the brake 21 and serves as a reaction element for this gear set. Forward driving torque supplied to the ring gear 45 drives the planet gears 47 and the planet gear carrier 48 forwardly at a reduced speed ratio. Forward driving torque from the planet gear carrier 48 is transmitted through the planet gear carrier 54 of the rear planetary gear set 19 to the driven shaft 12.

High or direct forward speed drive is obtained by disengagement of the brake 21 and engagement of the rear clutch 3. The front clutch 22 remains engaged as before. The engaged clutches 22 and 23 function to lock together the sun gear 46 and ring gear 45, thereby locking up the front planetary gear set 18. Locking up the gear set 18 also locks together the planetary gear carrier 54 and sun gear 52 of the gear set 19, so that both gear sets 18 and 19 rotate as a unit and high or direct forward speed drive is obtained.

Reverse drive is obtained by engagement of the rear clutch 23, and the rear brake 24, and disengagement of the front clutch 22. For this condition, forward driving torque from the drive shaft 11 is transmitted through the torque converter 15, the intermediate shaft 13, drum 70, and rear clutch 23 to the sun gear 46 of the front planetary gear set 18. The rear brake 24 functions to hold stationary the ring gear 51 of the rear planetary gear 19. The ring gear 51, therefore, functions as a reaction element for both gears sets 18 and 19, and the forward driving torque applied to the sun gear 46 is transformed into a reverse driving torque at the planet gear carrier 54 for driving the output shaft 12 in the reverse direction.

The power take-off unit 16 is operated by sliding the gear 38 into engagement with the idler gear 36. The power take-off unit 16 is operable whenever the intermediate shaft 13 is turning and with the transmission in neutral or in driving condition. In this condition, torque is transmitted from the engine through the drive shaft 11, torque converter 15, intermediate shaft 13, and gears 35, 36, and 38 to any suitable device (not shown) utilizing the auxiliary power.

The hydraulic retarder 17 is actuatable for any of the drive conditions described above by merely filling the cavity 40 with hydraulic fluid. The hydraulic controls for operating the retarder 17 will be described hereinafter.

The various driving gear ratios are summarized in the table below:

| Speed | Ratio | Front Clutch 22 | Rear Clutch 23 | Brake 24 | Brake 21 | One-Way Brake 25 |
|---|---|---|---|---|---|---|
| R | 2.79 | | x | | x | |
| N | | | | | | |
| D {1 | 2.67 | x | | | | x |
| 2 | 1.44 | x | | | | x |
| 3 | 1.00 | x | | x | | |
| L–1 or H–1 | 2.67 | x | | | x | |

Figure 2:
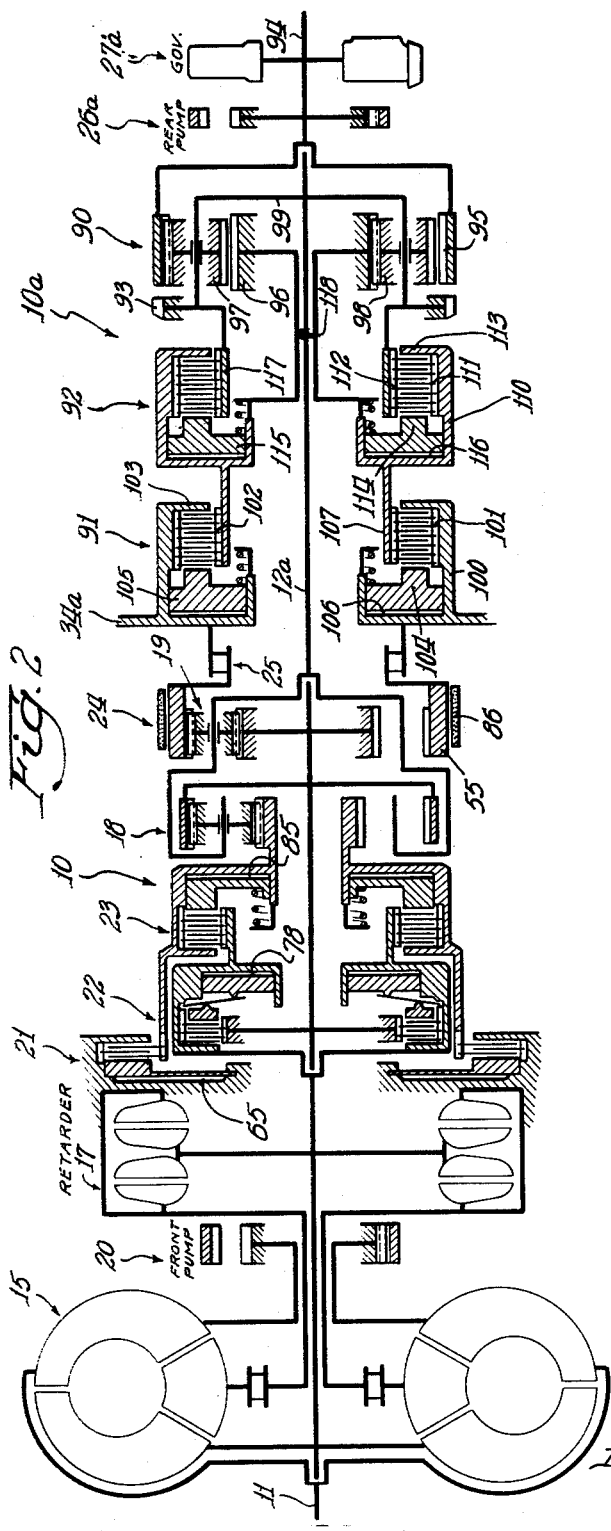
FIG. 2 is a longitudinal schematic drawing of a modification of the transmission shown in FIG. 1 capable of providing six forward drive speed ratios.

Referring now to FIG. 2, there is illustrated a modified transmission mechanism similar to that shown in FIG. 1, but including a 2-speed auxiliary gear unit or compounder 10a. The main or forward transmission section shown in FIG. 2 is substantially identical to the transmission mechanism 10 of FIG. 1, except that the power take-off unit 16 has been omitted and the output shaft 12 has been replaced by a third intermediate shaft 12a which comprises an input shaft to the auxiliary unit 10a.

The auxiliary unit 10a, in general, comprises a planetary gear set 90, a multiple disc brake 91, a multiple disc clutch 92, a power take-off gear 93, and an output shaft 94. A rear pump 26a and a governor 27a are connected to and driven by the outputshaft 94.

The planetary gear set 90 comprises a ring gear 95, a sun gear 96, planet gears 97 and 98, and a planet gear carrier 99. The planet gears 97 are in mesh with the planet gears 98 and with the ring gear 95, and the planet gears 98 are also in mesh with the sun gear 96. The ring gear 95 is connected to the output shaft 94, and the planet gear carrier 99 is splined to the intermediate shaft 12a. The power take-off gear 93 is also mounted or formed directly on the planet gear carrier 99.

The brake 91 comprises a drum portion 100 anchored to a casing portion 34, a plurality of friction discs 101 splined within the drum 101, a plurality of friction discs 102 interleaved with the discs 101, a fixed end pressure plate 103, and a movable pressure plate 104. The movable pressure plate 104 is formed integrally with an annular piston 105 slidably disposed within an annular cavity 106 formed in the casing 100. The friction discs 102 are splined to the exterior of an annular flange 107 which is connected to the sun gear 96.

The clutch 92 comprises an annular drum 110 a plurality of friction discs 111 splined within the drum 110, a plurality of friction discs 112 interleaved with the discs 111, a fixed end pressure plate 113 attached to the drum 110, and a movable pressure plate 114. The movable pressure plate 114 is formed integrally with a piston 115 which is slidably disposed in an annular cavity 116 formed within the drum 110. The friction discs 112 are splined to the exterior of an annular flange 117 which is connected to the planet gear carrier 99. The annular flange 107 of the brake 91 is formed integrally with the drum 110 which is also connected to a sleeve shaft 118 journalled on the input shaft 12a. The sun gear 96 is also keyed to the shaft 118.

In operation, the transmission mechanism of FIG. 2 provides a total of six forward speed drives and a reverse drive. The front portion 10 of the transmission mechanism provides three forward speed drives and a reverse drive as previously described, and the two speed auxiliary unit 10a provides two additional speeds for each of the forward unit ratios giving a total of six available forward speed drives.

A low speed drive through the auxiliary unit 10a is provided by engagement of the brake 91. This is accomplished by supplying fluid under pressure to the annular cavity 106 so that the piston 105 presses the discs 101 and 102 into engagement. The engaged brake 91 functions to hold stationary the sun g ear 96 so that it serves as a reaction element for the planetary gear set 90. Driving torque from the front transmission unit is supplied through the input shaft 12a to the planet gear carrier 99 which drives the ring gear 95 and output shaft 94 in the same direction but at a reduced speed with respect to the input shaft 12a.

Direct drive through the auxiliary unit 10a is provided by engagement of the clutch 92 and this disengagement of the brake 91. The engaged clutch 92 functions to lock together the sun gear 96 and the planet gear carrier 99, thereby locking up the planetary gear set 90 so that it rotates as a unit, and a 1:1 or direct drive power train is obtained from the input shaft 12a to the output shaft 94.

The power take-off gear 93 is operable for either of the above driving conditions or when both the brake 91 and clutch 92 are disengaged and the vehicle is at rest. In this latter condition, driving torque from the front unit is supplied to the input shaft 12a and directly drives the planet gear carrier 99 and the power take-off gear 93, and no power is transmitted to the output shaft 94.

The power take-off unit 16 can optionally be included in the embodiment of FIG. 2 in lieu of the gear 93 or in addition to the gear 93, in the manner shown in FIG. 1.

The various driving gear ratios for the transmission of FIG. 2 are summarized in the following table:

| Speed | Ratio | Front Clutch 22 | Rear Clutch 23 | Brake 24 | Brake 21 | One-Way Brake 25 | Clutch 92 | Brake 91 |
|---|---|---|---|---|---|---|---|---|
| PTO | | | x | x | | | | |
| R | 5.86 | | x | x | | | | x |
| N | | | | | | | | |
| D2 {3 | 2.67 | x | | | | x | x | |
| 4 | 1.44 | x | | | x | | x | |
| 5 | 1.00 | x | | x | | | x | |
| D1 {1 | 5.61 | x | | | | x | | x |
| 2 | 3.02 | x | | | x | | | x |
| 3 | 2.10 | x | x | | | | | x |
| 4 | 1.44 | x | | | x | | x | |
| 5 | 1.00 | x | | x | | | x | |
| L–1 or H–1 | 5.61 | x | | x | | | | x |

Figure 3:
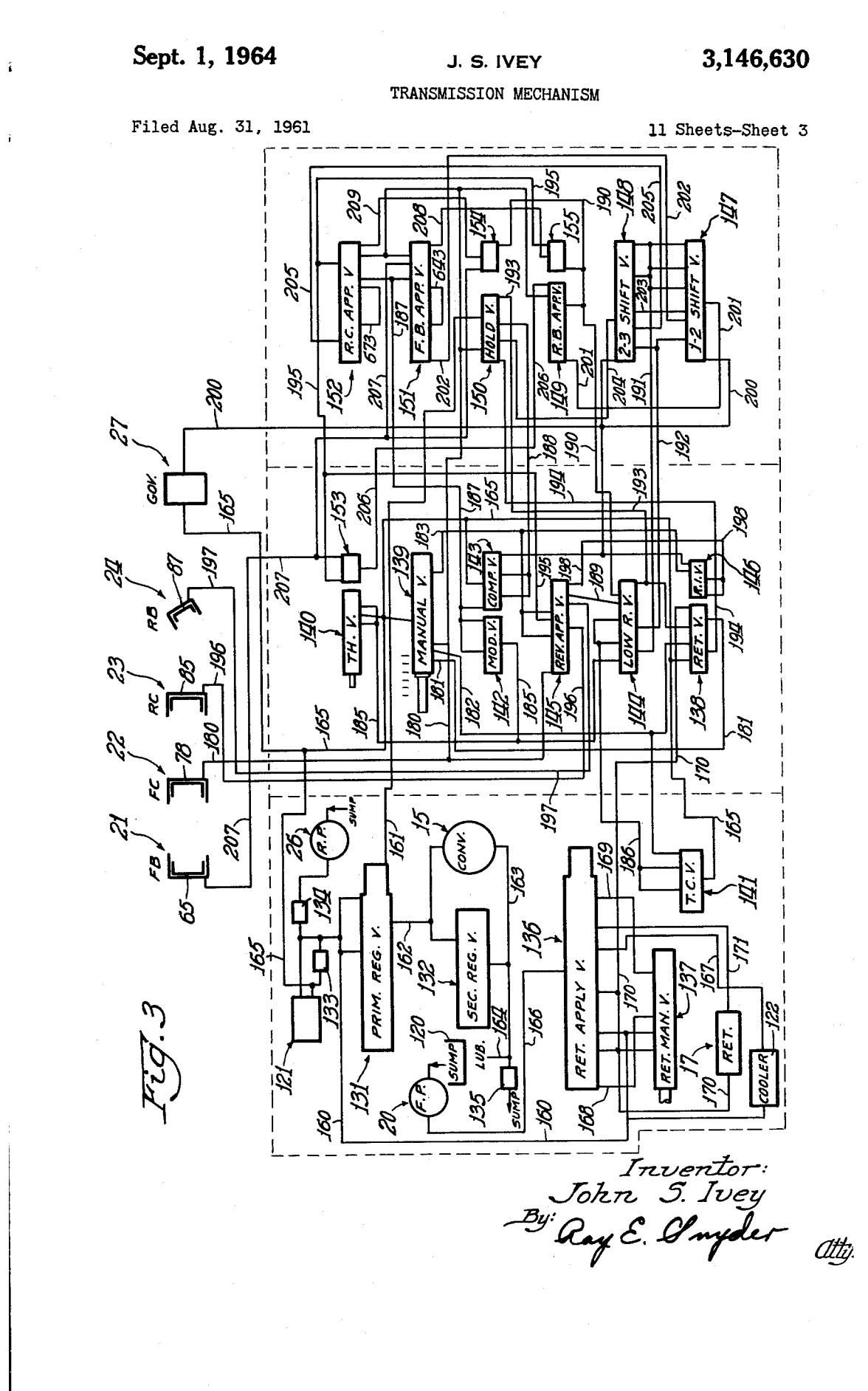

Referring to FIG. 3, the hydraulic control circuit for the transmission mechanism of FIG. 1 is illustrated and comprises the front pump 20, the rear pump 26, the converter 15, the retarder 17, the governor 27, the front brake 21, the front clutch 22, the rear clutch 23, and the rear brake 24. The hydraulic control circuit also includes a fluid reservoir or sump 120 located on the interior of the casing 34, a fluid filter 121, and a fluid cooler 122. In addition, the control system also comprises the following valves:

| | |
|---|---|
| 131 | Primary regulator valve |
| 132 | Secondary regulator valve |
| 133 | Filter check valve |
| 134 | Rear pump check valve |
| 135 | Converter relief check valve |
| 136 | Retarder apply valve |
| 137 | Retarder manual valve |
| 138 | Retard valve |
| 139 | Manual selector valve |
| 140 | Throttle valve |
| 141 | Throttle control valve |
| 142 | Modulator valve |
| 143 | Compensator valve |
| 144 | Low-range valve |
| 145 | Reverse apply valve |
| 146 | Reverse inhibitor valve |
| 147 | 1–2 shift valve |
| 148 | 2–3 shift valve |
| 149 | Rear brake apply valve |
| 150 | Hold valve |
| 151 | Front brake apply valve |
| 152 | Rear clutch apply valve |
| 153 | Rear brake gate valve |
| 154 | Rear clutch gate valve |
| 155 | Front brake gate valve |

The primary regulator valve 131 is connected by means of a conduit 160 with the filter 121, the filter check valve 133, the rear pump check valve 134, the retarder apply valve 136, the retarder manual valve 137, and the fluid cooler 122. The primary regulator valve 131 is also connected by means of a conduit 161 with the hold valve 150 and by means of a conduit 162 with the converter 15 and the secondary regulator valve 132.

The secondary regulator valve 132 is connected by means of a conduit 163 with the converter 15 and the converter relief check valve 135. An open end branch conduit 164 is connected to the conduit 163 for directing lubricating fluid to various parts of the transmission.

The filter check valve 133 is connected by means of a conduit 165 to the filter 121, the governor 27, the manual valve 139, the throttle valve 140, the compensator valve 143, the retard valve 138, and the throttle control valve 141. The conduit 165 will be referred to as the line pressure conduit hereinafter.

The retarder apply valve 136 is connected by means of a conduit 166 to the front pump 20, and by means of a conduit 167 to the cooler 122. The retarder apply valve 136 is also connected to the retarder manual valve 137 by means of conduits 168, 169, and 170, and to the retarder 17 by a conduit 171. The conduit 170 is also connected to the retarder 17 and to the retard valve 138.

The manual selector valve 139 is connected by means of a conduit 180 to the apply chamber 78 of the front clutch 22, to the reverse apply valve 145, the hold valve 150, the rear brake apply valve 149, the front brake apply valve 151, and the rear clutch apply valve 152. The selector valve 139 is also connected by means of a conduit 181 to the retard valve 138; by means of a conduit 182 with the retard valve 138 and the throttle control valve 141; and by means of a conduit 183 to the reverse apply valve 145 and reverse inhibitor valve 146.

The throttle valve 140 is connected by means of a conduit 185 to the modulator valve 142 and to the low range valve 144. The throttle control valve 141 is also connected by means of a conduit 186 to the low range valve 144.

The modulator valve 142 is connected by means of a conduit 187 to the compensator valve 143, the front brake apply valve 151, and the rear clutch apply valve 152. The compensator valve 143 is connected by means of a conduit 188 to the hold valve 150.

The low range valve 144 is connected by means of a conduit 189 to the reverse apply valve 145; by means of a conduit 190 to the rear brake apply valve 149, the front brake gate valve 155 and the rear clutch gate valve 154; by means of conduits 191, and 192 to the 1–2 shift valve 147 and the 2–3 shift valve 148; and by means of a conduit 193 to the retard valve 138 and the hold valve 150. The retard valve 138 is also connected by means of a conduit 194 to the hold valve 150.

The reverse apply valve 145 is connected by means of a conduit 195 to the rear clutch apply valve 152, the rear brake gate valve 153, and the front brake gate valve 155; by means of a conduit 196 to the rear clutch apply cavity 85; and by means of a conduit 197 with the rear brake apply cavity 87. The reverse apply valve 145 is also connected by means of a conduit 198 to the reverse inhibitor valve 146.

The governor 27 is connected by means of a conduit 200 to the compensator valve 143, the reverse inhibitor valve 146, the 1–2 shift valve 147, and the 2–3 shift valve 148.

The 1–2 shift valve 147 is connected by means of a conduit 201 to the rear brake apply valve 149; by means of a conduit 202 to the front brake apply valve 151; and by means of a conduit 203 to the 2–3 shift valve 148.

The 2–3 shift valve 148 is connected by means of a conduit 204 to the hold valve 150, and by means of a conduit 205 to the rear clutch apply valve 152.

The rear brake apply valve 149 is connected by means of a conduit 206 to the rear brake gate valve 153.

The front brake apply valve 151 is connected by means of a conduit 207 to the apply cavity 65 of the front brake 21, the rear brake gate valve 153, and the rear clutch gate valve 154. The valve 151 is also connected by means of a conduit 208 to the front brake gate valve 155.

The rear clutch apply valve 152 is connected by means of a conduit 209 to the rear clutch gate valve 154.

Referring now to FIGS. 4A, 4B, 4C, and 7, there is illustrated in greater detail the hydraulic circuit of FIG. 3. The valves comprising the hydraulic control circuit are constructed as follows:

The governor 27 illustrated in FIG. 7, comprises a casing 210 mounted for rotation on the output shaft 12, a centrifugal weight 211, and a valve sleeve 212. The valve sleeve 212 is slidably disposed within a stepped radial cylindrical bore 213 formed in the casing 210. A shaft portion of the weight 211 extends through the valve sleeve 212 and is retained slidably therein by means of a spring 214 and retaining cap attached to the inner end of the shaft portion. The valve sleeve 212 is formed with a small land 215 and an enlarged land 216. The casing portion 210 is also formed with ports 217, 218 and 219, all opening into the bore 213. The port 217 is connected to the line pressure conduit 165; the port 218 is connected to the governor pressure conduit 200; and the port 219 is a discharge port open to the sump 120.

The primary regulator valve 131 comprises a casing portion 220 formed with a stepped longitudinal cylindrical bore 221, a valve piston 222 slidably disposed within the bore 221, and a valve spring 223. The valve piston 222 is formed with lands 224, 225, and 226, and annular grooves 227 and 228 between the lands. The land 26 is of a smaller diameter than the lands 224 and 225. The casing 220 is also formed with ports 229, 230, 231, 232, and 233, all opening into the bore 221. The ports 229 and 231 are connected to the conduit 160 and the port 229 opens into an annular groove 234 surrounding the land 224. The port 230 is connected to the conduit 162; the port 232 is connected through a restriction 235 to the conduit 161; and the port 233 is open to the sump 120.

The secondary regulator valve 132 comprises a casing portion 240 formed with a stepped longitudinal cylindrical bore 241, a valve piston 242, and a valve spring 243. The valve piston 242 is slidably disposed within the bore 241, and is formed with a large land 244 and a small land 245, and an annular groove 246 between the lands. The casing 240 is formed with ports 247, 248, 249, and 250, all opening into the bore 241. The port 247 is connected to the conduit 162; the port 248 is connected to the conduit 163 and opens into an annular groove 251 surrounding the land 244; and the ports 249 and 250 are open to the sump 120.

The filter check valve 133 comprises a casing portion 253 formed with a cavity 254, a disc valve 255, and a spring 256. The casing portion 253 is also formed with an inlet port 257 and an outlet port 258 both opening into the cavity 254. The inlet port 257 is connected to the conduit 160 and the outlet port 258 is connected to the line pressure conduit 165. The spring 256 acts against the disc valve 255 tending to block the inlet port 257 and thereby prevent the passage of fluid from the conduit 160 into the conduit 165 unless the filter 121 is plugged.

The rear pump check valve 134 comprises a casing portion 260 formed with an internal cavity 261, a valve disc 262, and a spring 263. The casing 260 is also formed with a fluid inlet port 264 and an outlet port 265. The inlet port 264 is connected to the outlet of the rear pump 26 and the outlet port 265 is connected to the conduit 160. The spring 263 acts against the disc valve 262 tending to seal against the inlet port 264 and functions to prevent passage of fluid from the conduit 160 into the rear pump 26 when it is not operating. The rear pump 26 provides fluid pressure for completing a power train through the transmission for push-starting the vehicle engine.

The converter relief check valve 135 comprises a casing portion 270 formed with an internal cavity 271, a valve disc 272, and a spring 273. The casing 270 is also formed with an inlet port 274 and an outlet port 275. The spring 273 acts against the valve disc 272 tending to seal against the inlet port 274. The valve disc 272 is unseated from the inlet port 274 whenever the pressure in the conduit 163 exceeds a predetermined minimum value and thereby prevents the build-up of excessive fluid pressure within the converter 15.

The retarder apply valve 136 comprises a casing 280 formed with a longitudinal cylindrical bore 281 and a contiguous bore of reduced diameter 282 at one end of the valve, a valve piston 283, and a valve spring 284. The valve piston 283 is slidably disposed within the bores 281 and 282 and is formed with lands 285, 286, 287, 288, and 289 and annular grooves 290, 291, 292, and 293 between the lands. The valve piston 283 is also formed with a longitudinal cylindrical bore 294 extending throughout a portion of its length. The bore 294 opens into the bore 282 through a port 295 in an end of the piston 283 and into the bore 281 through a port 296 between lands 287 and 288. The casing portion 280 is also formed with ports 297, 298, 299, 300, 301, 302, 303, 304, and 305, all opening into bore 281. The port 297 is connected to conduit 168; the ports 298 and 300 are connected to conduit 170; the port 299 is connected to the conduit 160; the port 301 is connected to the conduit 166; the port 302 is connected to the conduit 167; the port 303 is connected to the conduit 171; the port 304 is connected to the conduit 169; and the port 305 is open to the sump 120.

The retarder manual valve 137 comprises a casing portion 310 formed with a longitudinal cylindrical bore 311 and a manually operated valve piston 312 slidably disposed within the bore 311. The valve piston 312 is formed with an external connecting shaft 313, lands 314, 315, and 316, and annular grooves 317 and 318 between the lands. The casing portion 310 is also formed with ports 319, 320, 321, 322, 323, 324, and 325, all opening into the bore 311. The port 319 is connected to the conduit 170; the port 320 is connected to the conduit 160; the port 321 is connected to the conduit 168; the port 322 is connected to the conduit 169; and the ports 323, 324, and 325 are open to the sump 120. The valve piston 312 is adapted to be moved manually by any suitable manual control located within the cab of the vehicle in which the transmission is installed.

The retard valve 138 comprises a casing portion 330 formed with a longitudinal cylindrical bore 331, a valve piston 332, and a valve spring 333. The valve piston 332 is slidably disposed within the bore 331 and is formed with lands 334, 335, and 336 and annular grooves 337 and 338 between the lands. The casing portion 330 is also formed with ports 339, 340, 341, 342, 343, 344, 345, and 346, all opening into the bore 331. The port 339 is connected to conduit 165; the port 340 is connected to conduit 182; the port 341 is connected to conduit 193; the port 342 is connected to conduit 170; the port 343 is connected to conduit 181; the port 344 is connected to conduit 194; and the ports 345 and 346 are open to the sump 120.

The manual valve 139 comprises a casing portion 348 formed with a longitudinal cylindrical bore 349 and a valve piston 350 slidably disposed within the bore 349. The piston 350 is formed with an external connecting shaft 351, lands 352, 353, and 354, and annular grooves 355 and 356 between the lands. The casing portion 348 is formed with ports 357, 358, 359, 360, 361, 362 and 363, all opening into the bore 349. The port 357 is connected to the line pressure conduit 165; the port 359 is connected to the conduit 181; the port 360 is connected to the conduit 182; the port 361 is connected to the conduit 180; the port 362 is connected to the conduit 183; and ports 358 and 363 are open to the sump 120.

The valve piston 350 is adapted to be moved longitudinally by any suitable linkage into any one of six selective positions. These positions are designated by the letters "P" for Park; "R" for Reverse; "N" for Neutral; "D" for Drive; "H" for Hold; and "L" for Low. Movement of the manual valve piston 350 functions to direct line pressure from the conduit 165 to other conduits for establishing the various driving gear ratios through the transmission, as will be described hereinafter.

The throttle valve 140 comprises a casing portion 370, formed with a stepped longitudinal cylindrical bore 371, a first valve piston 372, a second valve piston 373, and springs 374 and 375. The spring 374 is disposed between the valve pistons 372 and 373 and the spring 375 is located at the right end of the valve piston 373 as shown. The valve piston 372 is formed with a connecting rod 376 which is connected through any suitable linkage to the accelerator pedal of the vehicle or to a manifold vacuum responsive servomotor (not shown). The valve piston 373 is formed with lands 377, 378, and 379 and annular grooves 380 and 381 between the lands. The land 379 is of a smaller diameter than lands 377 and 378. The casing portion 370 is also formed with ports 382, 383, 384, 385, 386, and 387, all opening into the bore 371. The port 382 is connected to the conduit 185; the port 383 is connected to the line pressure conduit 165; the port 384 is connected through a restriction 388 to the conduit 185; and the ports 385, 386, and 387 are open to the sump 120.

The throttle control valve 141 comprises a casing portion 390 formed with a stepped longitudinal cylindrical bore 391, a valve piston 392, and a valve spring 393, acting against the left end of the valve piston 392. The valve piston 392 is slidably disposed within the bore 391 and is formed with lands 394, 395 and 396, and annular grooves 397 and 398 between the lands. The land 396 is of a smaller diameter than the lands 394 and 395. The casing portion 390 is also formed with ports 399, 400, 401, 402, 403 and 404, all opening into the bore 391. The port 399 is connected through a restriction 405 to the conduit 182; the port 400 is connected through a restriction 406 to the conduit 186; the port 401 is also connected to the conduit 186; the port 402 is connected to the conduit 165; and the ports 403 and 404 are open to the sump 120.

The modulator valve 142 comprises a casing portion 410 formed with a stepped longitudinal cylindrical bore 411, a valve piston 412, and a valve spring 413 acting against the left end of the valve piston 412. The valve piston 412 is slidably disposed within the bore 411 and is formed with lands 414, 415 and 416, and annular grooves 417 and 418 between the lands. The land 416 is of a slightly smaller diameter than the lands 415 and 416. The casing portion 410 is also formed with ports 419, 420, 421, 422, 423 and 424, all opening into the bore 411. The port 419 is connected through a restriction 425 to the conduit 187; the port 420 is also connected to the conduit 187; the port 421 is connected to the conduit 185; and the ports 422, 423 and 424 are all open to the sump 120.

The compensator valve 143 comprises a casing portion 430 formed with a stepped longitudinal cylindrical bore 431, a valve piston 432, and a valve spring 433 acting against the right end of the valve piston 432. The valve piston is slidably disposed within the bore 431 and is formed with lands 434, 435 and 436, and annular grooves 437 and 438 between the lands. The land 436 is of a slightly smaller diameter than the lands 437 and 438. The casing portion 430 is also formed with ports 439, 440, 441, 442, 443 and 444, all opening into the bore 431. The port 439 is connected to the governor pressure conduit 200; the port 440 is connected to the conduit 188; the port 441 is also connected through a restriction 445 to the conduit 188; the port 442 is connected to the conduit 187; the port 443 is connected to the line pressure conduit 165; and the port 444 is open to the sump 120.

The low range valve 144 comprises a casing portion 450 formed with a longitudinal cylindrical bore 451, a valve piston 452 and a valve spring 452' acting against the left end of the valve piston 452. The valve piston 452 is slidably disposed within the bore 451 and is formed with lands 453, 454, 455 and 456, and annular grooves 457, 458 and 459 between the lands. The casing portion 450 is also formed with ports 460, 461, 462, 463, 464, 465, 466, 467, 468, 469 and 470, all opening into the bore 451. The port 461 is connected to the conduit 185; the port 462 is connected to the conduit 191; the ports 463 and 466 are connected to the conduit 186; the port 465 is connected to the conduit 192; the port 468 is connected to the conduit 189; the port 470 is connected to the conduit 193; and the ports 460, 464, and 467 are all open to the sump 120.

The reverse apply valve 145 comprises a casing portion 480 formed with a longitudinal cylindrical bore 481, a valve piston 482 and a valve spring 483 acting against the left end of the valve piston 482. The piston 482 is slidably disposed within the bore 481 and is formed with lands 484, 485, and 486, and annular grooves 487 and 488 between the lands. The casing portion 480 is also formed with ports 489, 490, 491, 492, 493, 494, 495 and 496. The port 489 is connected to the conduit 180; the ports 490 and 493 are connected to the conduit 183; the port 491 is connected to the conduit 196; the port 492 is connected to the conduit 195; the port 494 is connected to the conduit 197; the port 495 is connected to the conduit 189; and the port 496 is connected to the conduit 198.

The reverse inhibitor valve 146 comprises a casing portion 500 formed with a longitudinal cylindrical bore 501, a valve piston 502 and a valve spring 503 acting against the left end of the valve piston 502. The valve piston 502 is slidably disposed in the bore 501 and is formed with lands 504 and 505, and an annular groove 506 between the lands. The casing portion 500 is also formed with ports 507, 508, 509, 510, and 511, all opening into the bore 501. The ports 507 and 509 are connected to the conduit 198; the port 510 is connected to the conduit 183; the port 511 is connected to the conduit 200; and the port 508 is open to the sump 120.

The 1–2 shift valve 147 comprises a casing portion 520 formed with a stepped longitudinal cylindrical bore 521, a valve piston 522 and a valve spring 523 acting against the right end of the valve piston 522. The valve piston 522 is slidably disposed within the bore 521 and is formed with lands 524, 525, 526, 527, 528 and 529, and annular grooves 530, 531, 532, 533 and 534 between the lands. The land 524 is of a slightly greater diameter than the land 525 which is, in turn, of a greater diameter than the lands 526. Lands 526 and 527 are of same diameter and lands 528 and 529 are of successively smaller diameters. The casing portion 520 is also formed with ports 535, 536, 537, 538, 539, 540, 541, 542, 543, 544, 545 and 546 all opening into the bore 521. The port 535 is connected to the governor pressure conduit 200; the port 537 is connected to the conduit 192; the port 539 is connected to the conduit 202; the port 540 is connected to the conduit 203; the port 541 is connected to the conduit 201; the ports 543, 545 and 546 are all connected to the conduit 191; and the ports 536, 538, 542 and 544 are all open to the sump 120.

The 2–3 shift 148 comprises a casing portion 550 formed with a stepped longitudinal cylindrical bore 551, a valve piston 552 slidably disposed within the bore 551, and a valve spring 553 acting against the right end of the valve piston 552. The valve piston 552 is formed with lands 554, 555, 556, 557 and 558, and annular grooves 559, 560, 561 and 562 between the lands. The land 554 is of greater diameter than the lands 555 and 556, and the lands 557 and 558 are of successively smaller diameters. The casing portion 550 is also formed with ports 563, 564, 565, 566, 567, 568, 569, 570, 571 and 572. The port 563 is connected to the governor pressure conduit 200; the port 564 is connected to the conduit 192; the port 566 is connected to the conduit 205; the port 567 is connected to the conduit 204; the port 568 is connected to the conduit 203; the ports 570 and 572 are connected to the conduit 191; and the ports 565, 569, and 571 are all open to the sump 120.

The rear brake apply valve 149 comprises a casing portion 580 formed with a stepped longitudinal cylindrical bore 581, valve plugs 582 and 583, a valve piston 584 and a valve spring 585 acting against the right end of the valve piston 584. The plugs 582 and 583 and the valve piston 584 are all slidably disposed within the bore 581. The valve piston 584 is formed with lands 586 and 587, and an annular groove 588 between the lands. The diameter of the plugs 582 and 583 is greater than that of the land 586, and the land 587 is of a slightly greater diameter than the land 586, but smaller than 582 and 583. The casing portion 580 is also formed with ports 589, 590, 591, 592, 593, 594 and 595, all opening into the bore 581. The port 589 is connected to the conduit 201; the port 593 is connected to the conduit 190; the port 595 is connected to the conduit 206; the port 594 is connected through a restriction 596 to the conduit 180; and the ports 590, 591 and 592 are all open to the sump 120.

The hold valve 150 comprises a casing portion 600 formed with a longitudinal cylindrical bore 601, a valve piston 602 slidably disposed within the bore 601, and a valve spring 603 acting against the right end of the valve piston 602. The valve piston 602 is formed with lands 604, 605 and 606 of the same diameter, and annular grooves 607 and 608 between the lands. The casing portion 600 is also formed with ports 609, 610, 611, 612, 613, 614, 615 and 616 all opening into the bore 601. The port 609 is connected to the conduit 194; the port 610 is connected to the conduit 180; the port 611 is connected to the conduit 204; the port 613 is connected to the conduit 188; the port 614 is connected to the conduit 161; the port 616 is connected to the conduit 193; and the ports 612 and 615 are open to the sump 120.

The front brake apply valve 151 comprises a casing portion 620 formed with a stepped longitudinal cylindrical bore 621, valve plugs 622, 623 and 624, a valve piston 625 and a valve spring 626 acting against the right end of the valve piston 625. The valve plugs 622–624 and the valve piston 625 are all slidably disposed in line within the bore 621. The valve piston 625 is formed with lands 627, 628 and 629, and annular grooves 630 and 631 between the lands. The lands 627 and 628 and the plug 624 are of a smaller diameter than the plugs 622 and 623, the land 629 is of a slightly larger diameter than lands 627 and 628, but the diameter of land 629 is smaller than the diameter of the plugs 622 and 623. The casing portion 620 is also formed with ports 632, 633, 634, 635, 636, 637, 638, 639, 640, 641 and 642, all opening into the bore 621. The port 632 is connected to the conduit 202; the ports 634 and 637 are interconnected through a common conduit 643; the port 638 is connected to the conduit 187; the port 640 is connected to the conduit 207; the port 641 is connected through a restriction 644 to the conduit 180; the port 642 is connected to the conduit 208; and the ports 633, 635, 636 and 639 are all open to the sump 120.

The rear clutch apply valve 152 comprises a casing portion 650 formed with a stepped longitudinal cylindrical bore 651, valve plugs 652, 653 and 654, a valve piston 655 and a valve spring 656 acting against the right end of the valve piston 655. The valve piston 655 is formed with lands 657, 658 and 659, and annular grooves 660 and 661 between the lands. The valve plugs 652 and 653 are of a greater diameter than the valve plug 654 and the lands 657 and 658 of the valve piston 655. The land 659 is also of a slightly greater diameter than the lands 657 and 658, but is of a smaller diameter than the plugs 652 and 653. The casing portion 650 is also formed with ports 662, 663, 664, 665, 666, 667, 668, 669, 670, 671 and 672. The port 663 is connected to the conduit 205; the ports 664 and 667 are interconnected through a common channel 673; the port 668 is connected to the conduit 187; the port 670 is connected to the conduit 195; the port 671 is connected through a restriction 674 to the conduit 180; the port 672 is connected to the conduit 209; and the ports 662, 665, 666 and 669 are all open to the sump 120.

The rear brake gate valve 153 comprises a casing portion 680 formed with a longitudinal cylindrical bore 681 and an annular internal groove 682, and a valve plug 683 slidably disposed within the bore 681. The casing portion 680 is also formed with ports 684, 685 and 686, all opening into the bore 681. The port 684 is connected to the conduit 195; the port 685 connects the annular groove 682 to the conduit 206; and the port 686 is connected to the conduit 207.

The rear clutch gate valve 154 comprises a casing portion 690 formed with a longitudinal cylindrical bore 691 and an annular internal groove 692, and a valve plug 693 slidably disposed within the bore 691. The casing portion 690 is also formed with ports 694, 695 and 696, all opening into the bore 691. The port 694 is connected to the conduit 207; the port 695 connects the annular groove 692 with the conduit 209; and the port 696 is connected to the conduit 190.

The front brake gate valve 155 comprises a casing portion 700 formed with a longitudinal cylindrical bore 701 and an annular internal groove 702, and a valve plug 703 slidably disposed within the bore 701. The casing portion 701 is also formed with ports 704, 705 and 706, all opening into the bore 701. The port 704 is connected to the conduit 190; the port 705 connects the annular groove 702 with the conduit 208; and the port 706 is connected to the conduit 195.

OPERATION

In operation, the hydraulic control system just described functions to establish the various driving gear ratios through the transmission as follows.

When the engine is running, the front pump 20 draws fluid from the sump 120 and discharges it into the conduit 166. The fluid passes through the port 301, through the groove 291 and port 302 into the conduit 167. From the conduit 167 the fluid passes through the cooler 122 into the conduit 160 where it flows to the ports 229 and 231 of the primary regulator valve 131. Fluid pressure acting on the differential area of lands 225 and 226 forces the valve piston 222 to the left against the action of spring 223. As the valve piston 222 is moved to the left, the port 229 is opened and fluid is allowed to pass through the groove 227 and through the port 230 into the conduit 162.

Fluid in the conduit 162 is supplied to the converter 15 and through port 247 to the secondary regulator valve 132. Fluid pressure acting on the differential area of the lands 244 and 245 of the secondary regulator valve piston 242 forces it to the left against the action of the spring 243. As the valve piston 242 is moved to the left, the port 248 is opened and fluid is allowed to pass into the conduit 163. A portion of the fluid in conduit 163 is supplied through the conduit 164 for lubricating the transmission, and the remainder is discharged through the check valve 135 into the sump 120.

Fluid pressure in the conduit 160 is regulated by the primary regulator valve 131 and is also supplied through the filter 121 into the line pressure conduit 165. The filter check valve 133 is normally closed, if the filter 121 is operating normally, but in the event that the filter 121 is plugged, the check valve 133 is permitted to open allowing fluid under pressure from the conduit 160 to pass directly into the line pressure conduit 165.

Neutral Condition

With the manual selector valve piston 350 in the position "N" shown, line pressure in conduit 165 is blocked at the port 357 and none of the servomotors are actuated for completing the various power trains.

Forward Drive Condition

The transmission mechanism 10 is conditioned for forward drive by moving the selector valve piston 350 into the "D" or drive position. In this position, port 358 is blocked by the land 352 and line pressure fluid is permitted to pass from the port 357 through the groove 355 between lands 353 and 352 and into the ports 359, 360, and 361. Line pressure fluid passing through the port 359 is supplied through conduit 181 to the port 343 of the retard valve 138; and line pressure fluid passing through the port 360 is directed through the conduit 182 to port 399 of the throttle control valve 141 and to port 340 of the retard valve 138. The line pressure supplied through ports 359 and 360 to the valves 138 and 141 conditions these two valves for operation which will be described subsequently.

Line pressure fluid supplied through port 361 passes through conduit 180 to the front clutch apply cavity 78. The front clutch 22 is engaged and remains engaged for all forward drive conditions. Fluid pressure in the conduit 180 is also supplied through port 489 to the left end of the reverse apply valve 145. Pressure in the bore 481 acts against the valve piston 482 and in conjunction with the action of spring 483 prevents movement of the valve piston 482 and thereby prevents the transmission from being shifted into reverse drive while the vehicle is moving forwardly.

Line pressure present in conduit 180 is also supplied to port 610 of the hold valve 150; to port 671 of the rear clutch apply valve 152; to port 641 of the front brake apply valve 151; and to port 594 of the rear brake apply valve 149. Line pressure at the port 671 of the rear clutch valve 152 is blocked initially by the land 659. Similarly, line pressure at port 641 is blocked initially by the land 629 and line pressure at the port 594 is blocked initially by the land 587.

Line pressure fluid in the conduit 180 at port 610 of the hold valve 150 passes through the annular groove 607 and port 611 into the conduit 204. From the conduit 204, fluid passes through the port 567 of the 2–3 shift valve 148, through the annular groove 561 and port 568 into the conduit 203. From the conduit 203, the fluid passes through port 540 of the 1–2 shift valve 147, through the annular groove 533 and port 541 into the conduit 201. Pressure in the conduit 201 is supplied through port 589 of the rear brake apply valve 149 where it acts against the left end of the valve plug 582 forcing the plug 583 and valve piston 584 to the right against the action of the spring 585. Moving the valve piston 584 to the right against the action of the spring 585 opens the port 594 and allows line pressure fluid to pass through groove 588 and port 593 into the conduit 190. From the conduit 190, fluid pressure is supplied to port 469 of the low-range valve 144; to the port 704 of the front brake gate valve 155 and to the port 696 of the rear clutch gate valve 154.

Fluid pressure at the port 469 of the low-range valve 144 is normally blocked in "D" or drive position by the land 456, as will be described. Fluid pressure at the port 704 of the valve 155 forces the valve plug 703 to the right and allows fluid to pass through the port 705, conduit 208, and port 642 of the front brake apply valve 151 and into the right end of the bore 621 where it augments the action of the spring 626 in holding the valve piston 625 to the left, as shown.

Fluid pressure at the port 696 of the valve 154 forces the valve plug 693 to the left and allows fluid to pass through the port 695, conduit 209 and port 672 into the right end of the bore 651 of the rear clutch apply valve 152 where it augments the action of the spring 656 in holding the valve piston 655 to the left, as shown.

As stated previously, line pressure at the port 469 of the low-range valve 144 is normally blocked in drive position by the land 456 of the valve piston 452. To obtain this condition, line pressure from the port 359 of the manual selector valve 139 is supplied through conduit 181, through port 343 of the retard valve 138, through the groove 338, port 341 and conduit 193 into the right end of the cavity 451. Fluid pressure supplied through the port 470 acts against the land 456 and forces the valve piston 452 to the left against the action of the spring 453 so that the land 456 blocks the port 469. In this port blocking condition, no pressure is supplied to the rear brake servo 87.

With the fluid pressure supplied as above described, the transmission is conditioned for low speed forward drive in normal automatic drive operation with the one-way brake 25 engaged. It is desirable to increase the line pressure and thereby increase the engaging force of the front clutch 22 for initially setting the vehicle in motion. Driving torque from the engine is increased by depressing the accelerator or throttle pedal and this torque is supplied through the converter 15 to the planetary gear sets 18 and 19.

In the illustrated position of the throttle valve 140, line pressure present in the conduit 165 is blocked at the port 383 by the land 378. Depression of the vehicle accelerator pedal has the effect of moving the piston 372 to the right compressing the spring 374. The spring 374, in turn, moves the valve piston 373 to the right against the action of the spring 375 so as to open the port 383 and permit fluid to flow through the groove 380 and port 382 into the conduit 185. Fluid pressure in the conduit 185 is supplied through the restriction 388 and port 384 into the bore 371 between lands 378 and 379. The force due to the fluid pressure acting on the differential area of lands 378 and 379 tends to force the valve piston 373 back to the left tending to close the port 383 and thereby regulating the pressure in conduit 185 as a function of accelerator pedal or throttle position. This pressure will hereinafter be referred to as throttle pressure.

Throttle pressure in the conduit 185 is also supplied to the port 421 of the modulator valve 142; and to the port 461 of the low-range valve 144. As previously described, the valve piston 452 has been moved to the left so that the port 461 is unblocked and fluid is permitted to pass through the groove 457 and port 462 into the conduit 191. Throttle pressure in the conduit 191 is supplied through ports 570 and 572 of the 2–3 shift valve 148 and through ports 543, 545 and 546 where it acts against the 1–2 shift valve piston 522. Throttle pressure acting on the shift valve pistons 522 and 552 tends to maintain them in a downshifted position as will be further described.

Throttle pressure supplied from the conduit 185 to the modulator valve 142 enters port 421 and passes through the groove 417 and port 420, into the conduit 187. From the conduit 187, pressure is directed through the restriction 425 and port 419 into the right end of the bore 411 where it acts against the land 416. Pressure acting against the right end of the valve piston 412 tends to force it to the left against the action of the spring 413 and thereby tends to close the port 421. The pressure in conduit 187 is thereby limited to some predetermined maximum pressure. The pressure obtained in conduit 187 will hereinafter be referred to as modulator pressure.

Modulator pressure is supplied through port 442 of the compensator valve 143; and to port 668 of the rear clutch apply valve 152 and to port 638 of the front brake apply valve 151. Modulator pressure at the ports 668 and 638 is blocked by the lands 653 and 623, respectively, until the valves are moved into a port-opening position.

The compensator valve 143 supplies a compensating pressure to the primary regulator valve 131 for regulating line pressure as will now be described. Line pressure is supplied from conduit 165 through port 443 where it flows through the groove 437 and port 440 into the conduit 188. Pressure in the conduit 188 is returned through the restriction 445 and port 441 into the groove 438 between lands 436 and 435. The force due to fluid line pressure acting on the differential area of lands 435 and 436 tends to move the valve piston 432 to the right against the action of the spring 433. This force combined with the force due to modulator pressure acting against the left end of the valve piston 432 tends to move the valve piston 432 still further to the right tending to close the port 443. The pressure thereafter obtained in conduit 188 is a regulated pressure less than line pressure and will hereinafter be referred to as compensator pressure.

Compensator pressure in the conduit 188 is supplied to port 613 of the hold valve 150 where it passes through the groove 608 and port 614 into the conduit 161. From the conduit 161 compensator pressure passes through the restriction 235 and port 232 into the bore 221 where it acts against the right end of the primary regulator valve piston 222. The compensator pressure acting against the valve piston 222 tends to move it to the left against the action of the spring 223 so as to regulate line pressure 165 at some lower value. Thereafter, line pressure increases or decreases inversely as the compensator pressure in conduit 161 increases or decreases.

When the vehicle is set into motion, line pressure is supplied through the conduit 165 to the port 217 of the governor valve 27. Initially, the land 215 of the valve sleeve 212 blocks the port 217. As the speed of the driven shaft 12 increases, centrifugal force acting on the weight 211 and sleeve 212 tends to force the valve sleeve 212 radially outward opening the port 217 and permitting line pressure to flow into the groove between the lands 215 and 216, and into the port 218. This pressure acts on the differential area of the lands and tends to force the sleeve 212 inwardly against the action of centrifugal force. The land 215 tends to close off the port 217 and reduce the pressure in the groove between the lands. The pressure obtained by the valve 27 therefore is regulated as a function of driven shaft speed and will hereinafter be referred to as governor pressure.

Governor pressure is supplied through the port 218 into conduit 200. From the conduit 200, this pressure is delivered to port 563 of the 2–3 shift valve 148; to port 535 of the 1–2 shift valve 147; to port 511 of the reverse inhibitor valve 146; and to port 439 of the compensator valve 143.

The governor pressure admitted into the bore 431 of the compensator valve 143 augments the action of the spring 433 in tending to force the valve piston 432 to the left against the action of compensator pressure and modulator pressure. The pressure in conduit 188, therefore, is increased and this pressure applied to the right end of the primary regulator valve piston 222 tends to reduce line pressure as a function of increasing vehicle speed. When the compensator pressure in line 188 is equal to line pressure, the line pressure remains constant for subsequent operation of the transmission controls.

Governor pressure supplied through conduit 200 to the 1–2 shift valve 147 is effective to cause an upshift from low speed forward drive to intermediate speed forward drive when a predetermined governor pressure is obtained. Governor pressure acts against the left end of the valve piston 522 and tends to force it to the right against the combined action of the spring 523, throttle pressure present in the right end of the bore 521 and in the groove 534 between lands 528 and 529, and line pressure in groove 533 which acts on the differential area of lands 527 and 528.

Throttle pressure increases as a function of increasing engine load or throttle position, and when the force due to governor pressure exceeds the combined force of throttle pressure, line pressure, and the action of the spring 523, the valve piston 522 is moved to the right. Movement of the valve piston 522 to the right cuts off the throttle pressure applied through the port 543 and line pressure applied through port 540 so that the forces due to these pressures acting on the respective differential areas are removed and insures that a downshift may occur only at a speed lower than that at which an upshift occurred. Cutting off the forces due to throttle and line pressure also insures that the valve piston 522 will move rapidly from one position to the other.

Movement of the 1-2 shift valve piston 522 to its upshifted position connects the port 539 with 540 and permits line pressure to flow from the port 540 through the groove 532 and port 539 into conduit 202 where it is supplied through port 632 to the left end of the front brake apply valve plug 622. This pressure acting against the left end of the valve plug 622 is sufficient to force the valve piston 625 to the right against the combined action of the spring 626 and of line pressure supplied through port 642, as previously described. Movement of the valve piston 625 to the right opens the port 641 and permits line pressure present in conduit 180 to flow through port 641, the groove 631, and port 640 into conduit 207. Line pressure in conduit 207 is supplied to the brake apply cavity 65 for engaging the front brake 21. Engagement of the front brake 21 completes the intermediate speed drive, as previously described, and the one-way brake 25 overruns.

Line pressure in the conduit 207 is also supplied through port 686 of the rear brake gate valve 153 where it forces the plug 683 to the left and permits fluid to pass through port 685 into conduit 206. Fluid pressure in conduit 206 is supplied through port 595 into the right end of cavity 581 of the rear brake apply valve 149 where it augments the action of the spring 585 in forcing the valve piston 584 to the left. Line pressure previously supplied from conduit 201 is exhausted through the port 542 of the 1-2 shift valve 147 and pressure supplied from conduit 206 insures that the valve piston 584 and plugs 582 and 583 are moved back to their illustrated positions. With the valve piston 584 in the position shown, conduit 190 is exhausted through port 593, the groove 583, and port 592 into the sump 120.

Line pressure in the conduit 207 is also supplied through port 694 of the rear clutch gate valve 154 where it forces the valve plug 693 to the right permitting fluid to pass through port 695 into conduit 209. From the conduit 209, fluid flows through port 672 into the right end of bore 651 of the rear clutch apply valve 152. This latter pressure augments the action of the spring 656 in holding the valve piston 655 and valve plugs 652, 653 and 654 to the left, as shown.

As the vehicle speed continues to increase, a point is reached at which an upshift from intermediate to direct or third speed forward drive is obtained. The upshift is obtained by the 2-3 shift valve as follows: Governor pressure supplied from the conduit 200 through the port 563 acts against the left end of the valve piston 552 and when this pressure is sufficient to overcome the combined action of the spring 553, of throttle pressure acting on the right end of the valve piston 552 and on the differential area between the lands 557 and 558, and of line pressure acting on the differential area between lands 556 and 557, the valve piston 552 is forced to the right into an upshifted position. In this position, line pressure at the port 567 is directed through the groove 560, and the port 566 into the conduit 205. From the conduit 205 line pressure is supplied through the port 663 of the rear clutch apply valve 152 into the space between the plugs 652 and 653 and is effective to force the plug 654 and the valve piston 655 to the right against the combined action of the spring 656 and line pressure supplied through the port 672. When the valve piston 655 has been moved to the limit of its motion to the right, line pressure fluid is permitted to flow from the conduit 180 through the restriction 674, the port 671, the groove 661 and port 670 into conduit 195. Line pressure in the conduit 195 is supplied to the port 492 of the reverse apply valve 145 where it flows through the groove 487, the port 491, and the conduit 196 to the supply cavity 85 of the rear clutch 23.

When the 2-3 shift valve piston 552 is moved into the upshifted position, any accumulated fluid under pressure within the conduit 203 is drained through the port 568, the groove 561, and the port 569 into the sump 120. With the port 569 open to the sump, the conduit 203 is also effective to drain any accumulated fluid from the conduit 202 through the ports 539 and 540 so that line pressure is removed from the left end of the plug 622 of the front brake apply valve 151. The valve piston 625, however, remains at the limit of its motion to the right against the action of the spring 626 by virtue of the forces due to modulator pressure and due to line pressure acting on the differential area between the lands 628 and 629. Modulator pressure from the valve 142 is supplied through the conduit 187, port 638, the groove 630, the port 637, the channel 643, and port 634 into the space between the plugs 624 and 623. Modulator pressure acting on the left end of the plug 624 tends to hold or maintain the valve piston 625 to the right against the action of the spring 626. It is important to maintain the valve piston 625 at the limit of its motion to the right until the rear clutch 23 is sufficiently engaged. In the absence of this provision, there may be an interruption in the power train and the engine will tend to race away or overspeed.

Line pressure in the conduit 195 is also supplied to port 684 of the rear brake gate valve 153 where it forces the valve plug 683 to the right and permits fluid to flow through port 685 into conduit 206. From conduit 206 the fluid is supplied to the rear brake apply valve 149 through port 595. Fluid under pressure admitted into the bore 581 through the port 595 augments the action of the spring 585 in holding the valve piston 584 to the left. With the rear brake apply valve 149 held in the illustrated position, it insures that no fluid pressure can be supplied to the rear brake servo 87 for establishing a different power train until fluid pressure is supplied to the left end of the valve plug 582 for moving the valve piston 584 to the right. The hydraulic control system has now been conditioned for establishing direct drive condition through the transmission mechanism.

Line pressure in the conduit 195 at this time is also supplied to the port 706 of the front brake gate valve 155 where it forces the valve plug 703 to the left permitting fluid to flow through the port 705 and conduit 208 and port 642 into the bore 621 at the right end of the valve piston 625 where it augments the action of the spring 626 in tending to force the piston 625 to the left. The restriction 674 limits the rate of flow of fluid into conduit 195, and when the pressure builds up sufficiently so that the rear clutch 23 is capable of transmitting engine torque, this pressure is also sufficient to overcome the force due to modulator pressure, acting against the left end of the valve piston 625 and, of line pressure acting on the differential area between the lands 628 and 629. The valve piston 625 is then moved to the left into its illustrated position and exhausts the front brake apply cavity 65 through the conduit 207, port 640, groove 631, and port 639 into the sump 120. The delay in disengagement constitutes a controlled overlap which prevents race-away of the engine during shift in gear ratio.

Downshifts from direct to intermediate speed forward drive and from intermediate to low speed forward drive are produced in the reverse manner from that just described as governor pressure acting on the left end of the shift valves 148 and 147 decreases with decreasing vehicle speed.

Inhibited Low Drive

An inhibited low speed forward drive condition is established by shifting the manual shift valve 139 into the "L" position. If the vehicle is at rest when this condition is established, no upshift from low will occur as the vehicle speed increases. However, if the vehicle is already in motion when the shift of the manual valve 139 is made, a downshift from direct to intermediate or from intermediate to low is obtained only if the vehicle speed drops below some predetermined value. If the vehicle downshifts from high to intermediate no subsequent upshift will occur. Similarly, if a downshift from intermediate to low occurs, no subsequent upshift will occur.

With the manual selector valve 139 in the "L" position, low speed forward drive condition is obtained through the hydraulic control system as follows:

Line pressure from the conduit 165 is supplied through port 357, through the groove 355 and through port 361 into the conduit 180. Pressure is cut off from the ports 358, 359, and 360 by the land 352 and they are exhausted to the sump 120. Low speed forward drive condition is obtained as previously described, except that the rear brake 24 is engaged in addition to the one way brake 25.

With port 359 open to the sump 120, fluid pressure previously supplied to the right end of the low range valve 144 is drained through port 470, conduit 193, port 341 of the retard valve 138, groove 338, port 343 and conduit 181, and ports 359 and 358. Removal of pressure from the right end of the low range valve piston 452 enables the spring 452 to force it to the right into the illustrated position, and line pressure fluid is supplied to the rear brake 24 as follows:

Movement of the valve piston 452 to its illustrated position permits line pressure fluid to flow through port 469, groove 459, port 468 and conduit 189 to the reverse apply valve 145. From conduit 189 fluid flows through port 495, groove 488, and port 494 into conduit 197 and to the rear brake apply cavity 87 for engaging the rear brake 24.

The throttle control valve 141 insures that no upshift from this drive condition can be obtained in the following manner:

Line pressure in the conduit 165 was previously supplied to the port 402 of the throttle control valve 141 but was blocked by the land 395. The valve piston 392 was maintained in a port blocking position by reason of line pressure supplied from conduit 182 into the right end of the bore 391 where it acted against the land 396 forcing the valve piston 392 to the left against the action of the spring 393. In the low range position, however, the port 360 is open to the sump 120 and any accumulated fluid under pressure in conduit 182 is drained or exhausted and the spring 393 is effective to force the valve piston 392 to the right so that the port 402 is open. Line pressure from conduit 165 is then permitted to flow through the groove 397 and port 401 into conduit 186. The fluid under pressure in conduit 186 is returned to the bore 391 through restriction 406 and port 400 into the groove 398 between lands 395 and 396. Fluid under pressure in groove 398 acts against the differential area between lands 395 and 396 tending to force the valve piston 392 to the left against the action of the spring 393 and thereby tending to close off the port 402. The throttle control valve 141 hereby functions to regulate the fluid in conduit 186 at some constant pressure less than line pressure. The pressure existing in conduit 186 will hereinafter be referred to as inhibited throttle pressure.

Inhibited throttle pressure in the conduit 186 is supplied to the low-range valve 144 through ports 463 and 466. Fluid flows through the grooves 457 and 458 and ports 462 and 465 into the conduits 191 and 192, respectively. Inhibited throttle pressure in the conduit 191 is supplied to the shift valves 147 and 148 through ports 543, 545 and 546 of the 1-2 shift valve and through ports 570 and 572 of the 2-3 shift valve. Inhibited throttle pressure in the conduit 192 is supplied to the 1-2 shift valve 147 through the port 537 and to the 2-3 shift valve 148 through the port 564. The inhibited throttle pressure supplied to the shift valves 147 and 148 is effective to lock them in their downshifted position so that no subsequent upshift can occur.

In the event that the manual valve 139 is shifted into the low position while the vehicle is in motion and the shift valves 147 and 148 are in their upshifted position, fluid pressure in the conduit 192 is blocked at the ports 537 and 564 by the lands 525 and 554, respectively. Fluid pressure supplied from conduit 191 through ports 546 and 572 acts on the right ends of shift valves 147 and 148 in opposition to governor pressure and tends to produce a downshift at some predetermined speeds. Once either of the valves has downshifted, fluid pressure supplied from conduit 192 through ports 537 and 564 acts on differential areas between the lands and is sufficient to prevent governor pressure from causing an upshift.

Hold Condition

When the vehicle is in motion in a forward drive gear ratio, the transmission can be maintained in that particular gear ratio by moving the manual selector valve 139 into the "H" position. When the manual valve 139 is shifted into the H position, no shift of the transmission to another gear ratio can occur, regardless of changes in vehicle speed or throttle position. The manner in which this function is accomplished will now be described.

When the manual valve piston 350 is moved into the H position, the land 352 prevents line pressure from flowing to ports 358 and 359, which are now open to the sump 120. Line pressure in conduit 165 is supplied through port 357, the groove 355 and through ports 360 and 361 into the conduits 182 and 180, respectively. With port 359 open, line pressure previously existing in conduit 193 is permitted to drain through the retard valve 138 by way of port 341, groove 338, port 343, conduit 181 and port 359 into the sump 120. Line pressure in conduit 182 is supplied to port 340 of the retard valve 138 where it passes through the groove 337 and port 344 into conduit 194 and to the hold valve 150. Fluid pressure is admitted into the bore 601 from the conduit 194 through port 609 where it acts against the left end of the valve piston 602 and forces it to the right against the action of spring 603. Removal of pressure from the right end of the piston 602 through conduit 193 permits the valve piston 602 to be moved to the right.

When the hold valve piston 602 is moved to the right, port 610 is blocked by the land 604 and port 613 is blocked by the land 605. Blocking the port 610 prevents line pressure from being supplied from conduit 180 to either of the shift valves 147 and 148, thereby preventing a shift to any other gear ratio. Blocking port 613 prevents compensator pressure in conduit 188 from being supplied through conduit 161 to the right end of the regulator valve piston 131. The regulator valve 131, therefore, regulates line pressure at a maximum value.

It is desirable to maintain the line pressure at a maximum value so that the friction-engaging elements that are engaged for the particular gear ratio may be capable of transmitting maximum torque for any vehicle operating condition. When the valve piston 602 is moved into position where ports 610 and 613 are blocked, ports 612 and 615 are opened so that any accumulated fluid under pressure within conduits 204 and 161 may be drained into the sump 120.

When line pressure in conduit 180 is cut off from the shift valves 147 and 148 by the hold valve 150, no signal can be supplied to the left ends of the rear clutch apply valve 152, the front brake apply valve 151, or the rear brake apply valve 149. Line pressure in the conduit 180 is still supplied to the rear brake apply valve 149 through port 594, to the front brake apply valve 151 through port 641, and to the rear clutch apply valve 152 through port 671. Line pressure at these three ports is either blocked by a land of the respective valve piston, or is admitted into the bore where it engages its respective element and it holds that valve piston in its particular position by acting on a differential area. This insures that whichever of the clutches or brakes are engaged at the particular time the hold condition is established will remain engaged and that no shift to another gear ratio can occur notwithstanding changes in governor pressure or throttle pressure.

Retard Condition

The retarder 17 may be applied for any forward drive condition, and the hold condition is automatically established when the retarder 17 is applied, as will now be described.

The retarder 17 is operated by moving the retarder manual valve 137 to the right from its illustrated position. When the retarder manual valve piston 312 is moved to the right, the land 314 is effective to block the port 323, the land 316 blocks the port 322, and communication is established from conduit 160 to conduit 170 through port 320, groove 317 and port 319. In addition, when the valve piston 312 is moved to the right, port 324 is opened and any accumulated fluid in the left end of the retarder apply valve 136 is permitted to drain through port 297, conduit 168, port 321, groove 318 and port 324 into the sump 120.

Line pressure in conduit 170 is supplied to fill the retarder 17 and is also supplied to ports 298, and 300 of the retarder apply valve 136, and to port 342 of the retard valve 138. When the retarder 17 is filled, fluid is permitted to pass through conduit 171 and port 303 of the retarder apply valve 136 into the groove 292 between lands 287 and 288. As the pressure builds up in the groove 292, fluid passes through port 296, channel 294 and port 295 into the right end of bore 282 where it acts against the right end of the valve piston 283. When this pressure increases sufficiently, it is effective to move the valve piston 283 to the left against the action of the spring 284. When the valve piston 283 has been moved to the left, the land 287 is effective to cut off the flow of fluid from port 301 through port 302 and instead fluid from the front pump 20 passes through the port 300 into the conduit 170. Fluid in the conduit 170 flows through the retarder 17, conduit 171, port 303, through the groove 292 between lands 287 and 288 and through port 302 into the conduit 167. From conduit 167, the fluid flows through the cooler 122 and into the conduit 160 where it is supplied to the rest of the control system as previously described. Movement of the retarder valve piston 283 insures that fluid heated by the retarder 17 is cooled by cooler 122 before it is supplied to the remaining elements of the control system.

A substantial volume of fluid is required to fill the retarder cavity 40 and it is normally desired that this cavity be filled and emptied as quickly as possible. The pumps for supplying fluid have a limited capacity, and the peak drain on line pressure fluid required to fill the retarder cavity 40 conceivably could cause a drop in line pressure with a corresponding loss in engagement of the friction engaging elements. A compromise is accepted between the rate of filling the retarder 17 and the necessity of maintaining substantial line pressure. For this purpose, the port 320 of the retarder manual valve 137 is shown as a relatively restricted port for controlling the rate of fill of the retarder 17. Ports 300 and 301 of the valve 136 are substantially larger than port 320. Once the retarder is filled, flow from the front pump 20 is directed by the retarder apply valve 136 through port 301, groove 291, and port 300 into conduit 170 and the retarder 17. This ensures maximum flow of fluid through the retarder 17 and the cooler 122.

Line pressure in the conduit 170 that is supplied to the retard valve 138 is admitted to the bore 331 through the port 342 and is effective to move the valve piston 332 to the left against the action of the spring 333. When the valve piston 332 is so moved, ports 339 and 345 are opened, and ports 340 and 343 are blocked by the lands 335 and 336, respectively. Opening the port 345 permits any accumulated fluid within the conduit 193 and in the right end of the cavity 601 of the hold valve 150 to be drained through port 341, groove 338 and port 345 into the sump 120. Opening the port 339 permits line pressure in the conduit 165 to be supplied through the groove 337, port 344, and conduit 194 to port 609 of the hold valve 150. Line pressure acting against the left end of the hold valve piston 602 is effective to force it to the right against the action of the spring 603 and the hold condition is established as previously described. The hold valve 150 and related structure insure that no shift to a different gear ratio can occur while the retarder 17 is applied.

The provision of the retarder in the present transmission, therefore, permits it to be used as a brake in any forward drive gear ratio for descending hills and the kinetic energy of the vehicle is dissipated in the form of heat through the cooler 122.

Reverse Drive Condition

Reverse drive condition is obtained by shifting the manual valve 139 into the "R" position. In this condition, the land 354 blocks the port 363 and line pressure from conduit 165 is supplied through the port 357, the groove 356, and port 362 into the conduit 183. All of the ports 358, 359, 360 and 361 are open to the sump 120.

Line pressure in the conduit 183 is supplied to ports 490 and 493 of the reverse apply valve 145 and to port 510 of the reverse inhibitor valve 146. Initially, the ports 490 and 493 are blocked by the lands 484 and 485, respectively. When no governor pressure is present in conduit 200, the reverse inhibitor valve piston 502 is moved to the right into its illustrated position, and line pressure fluid from conduit 183 flows through port 510, the groove 506, and port 509 into the conduit 198. Line pressure in the conduit 198 is returned to the bore 501 of the inhibitor valve 146 through the port 507 where it augments the action of the spring 503 in forcing and holding the valve piston 502 to the right.

Line pressure in the conduit 198 is also supplied to the reverse apply valve 145 through the port 496 where it acts against the right end of the valve piston 482. This pressure is effective to move the piston 482 to the left against the action of the spring 483 and opens ports 490 and 493. Line pressure in the conduit 183 is then permitted to flow through port 490, the groove 487, and port 491 into the conduit 196 and to the rear clutch apply cavity 85 for engaging the rear clutch 23. Line pressure in conduit 183 also flows through port 493, the groove 487 and port 494 into conduit 197 and to the rear brake servo 87 for engaging the rear brake 24. The transmission mechanism 10 is then conditioned for reverse drive as previously described.

In event the vehicle is moving forwardly, so that governor pressure is present in conduit 200, the valve piston 502 of the reverse inhibitor valve 146 is forced to the left against the action of the spring 503 and the land 505 blocks the port 510 so that no line pressure can be supplied to the reverse apply valve 145. The reverse inhibitor valve 146, therefore, prevents the establishment of reverse drive condition as long as the vehicle is moving at a speed above some predetermined minimum value.

Referring to FIG. 5 and to FIGS. 6A–6D, there is illustrated a hydraulic control system for the transmission mechanism of FIG. 2. The control system of FIG. 5 employs many of the same valves utilized for the transmission of FIG. 1, except that additional valves and control elements are provided for establishing six forward speed drive ratios as compared to the three forward speed drive ratios in the transmission of FIG. 1. The control system shown in FIG. 5 employs the following valves and components which are common to both hydraulic systems:

| | |
|---|---|
| 15 | Converter |
| 17 | Retarder |
| 20 | Front pump |
| 26 | Rear pump |
| 120 | Sump |
| 121 | Filter |
| 122 | Cooler |
| 131 | Primary regulator valve |
| 132 | Secondary regulator valve |
| 133 | Filter check valve |
| 134 | Rear pump check valve |
| 135 | Converter relief check valve |
| 136 | Retarder apply valve |
| 137 | Retarder manual valve |
| 138 | Retard valve |
| 140 | Throttle valve |
| 141 | Throttle control valve |
| 142 | Modulator valve |
| 143 | Compensator valve |
| 144 | Low range valve |
| 146 | Reverse inhibitor valve |
| 150 | Hold valve |
| 153 | Rear brake gate valve |
| 154 | Rear clutch gate valve |
| 155 | Front brake gate valve |

In addition, the control system for the transmission of FIG. 2 includes the following valves which are different from or in addition to the valves in the control system of FIG. 3:

| | |
|---|---|
| 139a | Manual valve |
| 145a | Reverse apply valve |
| 149a | Rear brake apply valve |
| 151a | Front brake apply valve |
| 152a | Rear clutch apply valve |
| 800 | Governor control valve |
| 801 | 1-2 shift valve |
| 802 | 2-3 shift valve |
| 803 | 3-4 shift valve |
| 804 | 4-5 shift valve |
| 805 | Auxiliary brake apply valve |
| 806 | Auxiliary clutch apply valve |
| 807 | D2 range valve |
| 808 | Upshift sequence valve |
| 809 | Downshift sequence valve |

The various valves and components of the transmission that are common to both systems are connected in the same manner and similar numerals are used to designate the various conduits and valves.

The manual valve 139a is connected as previously described to conduits 165, 180, 181, 182, and 183. In addition, the manual valve 139a is connected by means of a conduit 810 to the auxiliary clutch apply valve 806, to the auxiliary brake apply valve 805, and to the D2 range valve 807. The manual valve 139a is also connected by means of a conduit 811 to the reverse apply valve 145a.

The reverse apply valve 145a is connected by means of conduits 180, 183, 195, 196, 197, 189, and 198, as previously described. In addition, the reverse apply valve 145a is connected by means of a conduit 812 to the auxiliary brake cavity 106 and to the auxiliary clutch apply valve 806 by means of a conduit 813 to the downshift sequence valve 809 to the D2 range valve 807, and to the auxiliary brake apply valve 805.

The governor control valve 800 is connected to the line pressure conduit 165, to the governor pressure conduit 200, and is connected by means of auxiliary governor pressure conduit 200a to the reverse inhibitor valve 146, to the compensator valve 143, to the 1-2 shift valve 801 and to the 2-3 shift valve 802.

The rear clutch apply valve 152a is connected to conduits 180, 187, 194, 209, and 673, as previously described. In addition the rear clutch apply valve 152a is connected by means of a conduit 814 to the downshift sequence valve 809 and by means of a conduit 815 to the upshift sequence valve 808.

The front brake apply valve 151a is connected to conduits 180, 187, 207, 208, and 643 as previously described. In addition, the valve is connected by means of a conduit 816 to the 1-2 shift valve 801 and by means of a conduit 817 to the upshift sequence valve 808.

The rear brake apply valve 149a is connected to conduits 180, 190, and 206, as previously described, and, in addition, is connected by means of a conduit 819 to the 1-2 shift valve 801 and by means of a conduit 820 to the D2 range valve 807.

The 4-5 shift valve 804 is connected by means of conduits 191 and 192 to the low range valve 144 and by means of conduit 200 to the governor valve 27a. In addition, the 4-5 shift valve 804 is connected by means of a conduit 818 to the hold valve 150; by means of a conduit 821 to the 3-4 shift valve 803; and by means of a conduit 822 to the upshift sequence valve 808 and to the auxiliary clutch apply valve 806.

The 3-4 shift valve 803 is also connected to conduits 191, 192 and 200 and, in addition, is connected by means of a conduit 823 to the D2 range valve 807; by means of a conduit 824 to the upshift sequence valve 808 and to the auxiliary clutch apply valve 806; and by means of a conduit 825 to the D2 range valve 807.

The 1-2 shift valve 801 is connected to conduits 191, 192, 200a, 816, and 819, and, in addition, is connected by means of a conduit 826 to the 2-3 shift valve 802.

The 2-3 shift valve 802 is also connected to conduits 191, 192, 200a, and 826, and, in addition, is connected by means of conduits 827 and 828 to the downshift sequence valve 809.

The auxiliary clutch apply valve 806 is connected to conduits 180, 810, 812, 822, and 824, and, in addition, is connected by means of a conduit 829 to the auxiliary clutch apply cavity 116, to the auxiliary brake apply valve 805, and to upshift sequence valve 808.

The auxiliary brake apply valve 805 is connected to conduits 180, 187, 810, and 829, and, in addition, is connected by means of a conduit 830 to the downshift sequence valve 809.

The D2 range valve 807 is connected to conduits 200, 810, 813, 820, 823, and 825, and, in addition, is connected by means of a conduit 831 to the upshift sequence valve 808 and to the downshift sequence valve 809.

The upshift sequence valve 808 is connected to conduits 822, 824, 815, 189, 829, 831, and, in addition, is connected by means of a conduit 832 to the downshift sequence valve 809.

In operation, the front pump 20 supplies fluid pressure, as previously described, and this pressure is regulated for line control by the primary regulator valve 131 and is regulated for the converter 15 by the secondary regulator valve 132. The retarder apply valve 136 and the retarder manual valve 137 are effective to direct line pressure to the retarder 17 when desired, as previously described.

The manual valve 139a is similar in construction to the manual valve 139 but provides one additional drive range and, in addition, provides a power take-off operative position. The manual valve piston 350 is adapted to be moved into any one of seven selective positions designated as "PTO" for power take-off; "R" for reverse; "N" for neutral; "D2" for the forward drive range employing three forward speeds; "D1" for the forward drive range employing five of the available forward speeds; "H" for the hold condition; and "L" for the inhibited low condition.

To provide the additional conduit connections for the added selective positions, two additional ports 835 and 836 are provided. Port 835 is connected to conduit 183 and port 836 is connected to conduit 811. Port 358, which was formerly open to the sump, is connected to a conduit 810, which connects to the auxiliary clutch apply valve 806, the auxiliary brake apply valve 805, and the D2 range valve 807.

In the reverse apply valve 145a, the valve piston 482a is formed with an additional groove 837 and three additional ports are provided, 838, 839 and 840, connected to conduits 811, 812, and 813, respectively.

In the rear brake apply valve 149a, port 589 which was previously connected to the conduit 201 is now connected by means of conduit 819 to the 1–2 shift valve 801, and port 590 which was formerly open to the sump 120 is now connected by conduit 820 to the D2 range valve 807.

In the front brake apply valve 151a, the port 632 which was formerly connected to conduit 206 is now connected to conduit 816, and port 633, which was formerly open to the sump 120 is now connected to the conduit 817.

In the rear clutch apply valve 152a, port 662, which was formerly open to the sump 120, is now connected to conduit 814 and port 663, which was formerly connected to conduit 205, is now connected to conduit 815.

The governor control valve 800 comprises a casing portion 850 formed with a stepped longitudinal bore 851, a valve piston 852 slidably disposed in the bore 851, and a spring 853 acting against the right end of the valve piston 852. The valve piston 852 is formed with small lands 854 and 855, a relatively large land 856, and annular grooves 857 and 858 between the lands. The casing 850 is also formed with ports 859, 860, 861, 862, 863, and 864, all opening into the bore 851. The port 859 is connected through a restriction 865 to the conduit 200a and port 861 is also connected to conduit 200a; port 860 is connected to the line pressure conduit 165; port 864 is connected to the governor pressure conduit 200; and ports 862 and 863 are open to the sump 120.

The 1–2 shift valve 801 comprises a casing 870 formed with a stepped longitudinal cylindrical bore 871, a valve piston 872, and a spring 873 acting against the right end of the piston 872. The valve piston 872 is formed with a large land 874, two relatively smaller lands 875 and 876 of the same diameter, and lands 877 and 878 of successively smaller diameters, and annular grooves 879, 880, 881 and 882 between the lands. The casing 870 is formed with ports 883, 884, 885, 886, 887, 888, 889, 890, and 891, all opening into the bore 871. The port 883 is connected to the conduit 200a; port 884 is connected to conduit 192; port 886 is connected to conduit 816; port 888 is connected to conduit 819; port 890 is connected to conduit 191; and ports 885, 889 and 891, all open into the sump 120.

The 2–3 shift valve 802 comprises a casing portion 900 formed with a stepped longitudinal cylindrical bore 901, a valve piston 902, and a spring 903 acting against the right end of the piston 902. The valve piston is formed with a relatively large land 904, two relatively smaller lands 905 and 906 of the same diameter, and lands 907 and 908 of successively smaller diameters; and annular grooves 909, 910, 911, and 912 between the lands. The casing 900 is formed with ports 913, 914, 915, 916, 917, 918, 919, 920, 921, and 922, all opening into the bore 901. The port 913 is connected to conduit 200a; port 914 is connected to conduit 192; port 916 is connected to conduit 827; port 918 is connected to conduit 826; ports 920 and 922 are connected to conduit 191; and ports 915, 919 and 921 are open to the sump 120.

The 3–4 shift valve 803 comprises a casing 930 formed with a stepped longitudinal cylindrical bore 931, a valve piston 932, and a spring 933. The valve piston 932 is formed with lands 934, 935, 936, 937, 938, and 939; and annular grooves 940, 941, 942, 943, and 944 between the lands. The land 934 is of a relatively larger diameter than land 935; lands 936 and 937 are of the same diameter and are relatively smaller than land 935; and lands 938 and 939 are of successively smaller diameters. The casing 930 is formed with ports 945, 946, 947, 948, 949, 950, 951, 952, 953, 954, 955, and 956, all opening into the bore 931. The port 945 is connected to conduit 200; port 946 is connected to conduit 823; port 947 is connected to conduit 192; port 949 is connected to conduit 824; port 950 is connected to conduit 821; port 951 is connected to conduit 825; ports 953, 955 and 956 are all connected to the conduit 191; and ports 948, 952, and 954 are open to the sump 120.

The 4–5 shift valve 804 comprises a casing 960 formed with a stepped longitudinal cylindrical bore 961, a valve piston 962, and a spring 963. The valve piston 962 is formed with lands 964, 965, 966, 967, and 968; and annular grooves 969, 970, 971 and 972 between the lands. The land 964 is of a slightly larger diameter than lands 965 and 966 which are of the same diameter, and lands 967 and 968 are of successively smaller diameter. The casing 960 is formed with ports 973, 974, 975, 976, 977, 978, 979, 980, 981, and 982. Port 973 is connected to conduit 200; port 974 is connected to conduit 192; port 976 is connected to conduit 822; port 977 is connected to conduit 818; port 978 is connected to conduit 821; ports 980 and 982 are connected to conduit 191; and ports 975, 979, and 981 are open to the sump 120.

The auxiliary brake apply valve 805 comprises a casing 990 formed with a stepped longitudinal cylindrical bore 991, a valve piston 992, a fixed plug 993, movable plugs 994 and 995, a valve piston 996, and springs 997 and 998. The spring 997 is disposed between the valve piston 992 and the plug 993, and spring 998 acts against the right end of the valve piston 996. The valve piston 992 is formed with lands 999 and 1000 and an annuar groove 1001 between the lands. The fixed plug 993 is formed with an annular groove 1002 for receiving a retaining pin 1003. The valve piston 996 is formed with lands 1004, 1005, and 1006; and annular grooves 1007 and 1008 between the lands. The plug 994 is of a slightly larger diameter than plug 995 and, in turn, is slightly larger than lands 1004 and 1005. The land 1006 is slightly larger than land 1005 but smaller than the plug 994. The casing 990 is formed with ports 1009, 1010, 1011, 1012, 1013, 1014, 1015, 1016, 1017, 1018, 1019, 1020, 1021 and 1022. The port 1009 is connected to conduit 810; port 1010 is connected to conduit 830; ports 1011 and 1013 are interconnected through a channel 1023; ports 1014 and 1017 are interconnected through a channel 1024; port 1018 is connected to conduit 187; port 1020 is connected to conduit 813; port 1021 is connected through a restriction 1025 to conduit 180; port 1022 is connected to conduit 829; and ports 1012, 1015, 1016, and 1019 are open to the sump 120.

The auxiliary clutch apply valve 806 comprises a casing 1030 formed with a stepped cylindrical bore 1031, valve plugs 1032, 1033, 1034, and 1035, a valve piston 1036, and a spring 1037. The valve piston 1036 is formed with lands 1038, 1039, and 1040, and annular grooves 1041 and 1042 between the lands. The plugs 1032, 1033, and 1034 are of the same size and the plug 1035 is of a slightly smaller diameter. The land 1040 of the valve piston 1036 is slightly larger than the lands 1038 and 1039 but is smaller than the diameter of the plugs 1032, 1033, and 1034. The casing is formed with ports 1043, 1044, 1045, 1046, 1047, 1048, 1049, 1050, 1051, 1052, 1053 and 1054. The port 1043 is connected to conduit 824; port 1044 is connected to conduit 822; port 1045 is connected to conduit 810; ports 1046 and 1049 are interconnected through a channel 1055; port 1050 is connected to conduit 187; port 1052 is connected to conduit 829; port 1053 is connected through a restriction 1056 to conduit 180; port 1054 is connected to conduit 812; and ports 1047, 1048, and 1051 are open to the sump 120.

The D2 range valve 807 comprises a casing portion 1060 formed with a bore 1061, a valve piston 1062, and a spring 1063. The valve piston 1062 is formed with lands 1064, 1056, 1066, and 1067 and annular grooves 1068, 1069, and 1070 between the lands. The casing 1060 is formed with ports 1071, 1072, 1073, 1074, 1075, 1076, 1077, 1078, 1079, and 1080. The port 1071 is connected to conduit 810; port 1072 is connected to conduit 200; port 1073 is connected to conduit 823; port 1076 is interconnected through a restriction 1081 to conduit 820; port 1077 is connected to conduit 825; port 1078 is connected to a conduit 831; port 1080 is connected through a restriction 1082 to conduit 813; and ports 1074, 1075, and 1079 are open to the sump 120.

The upshift sequence valve 808 comprises a casing 1090 formed with a bore 1091, a valve piston 1092, and a spring 1093. The valve piston is formed with lands 1094, 1095, 1096, and 1097, and annular grooves 1098, 1099, and 1100 between the lands. The casing 1090 is formed with ports 1101, 1102, 1103, 1104, 1105, 1106, 1107, 1108, 1109, 1110, and 1111, all opening into the bore 1091. Port 1101 is connected to conduit 829; port 1103 is connected to conduit 817; port 1104 is connected to conduit 824; port 1106 is connected to conduit 815; port 1107 is connected to conduit 822; port 1109 is connected to conduit 832; port 1110 is connected to conduit 831; port 1111 is connected to conduit 180; and ports 1102, 1105, and 1108 are open to the sump 120.

The downshift sequence valve 809 comprises a casing 1120 formed with a bore 1121, a valve piston 1122, and a spring 1123. The valve piston is formed with lands 1124, 1125, 1126, and 1127; and annular grooves 1128, 1129, and 1130 between the lands. The casing 1120 is formed with ports 1131, 1132, 1133, 1134, 1135, 1136, 1137, 1138, 1139, 1140, and 1141, all opening into the bore 1121. Port 1131 is connected to conduit 813; ports 1132, 1137, and 140 are connected to conduit 831; port 1133 is connected to conduit 814; port 1134 is connected to conduit 827; port 1136 is connected to conduit 828; port 1138 is connected to conduit 195; port 1139 is connected to conduit 830; port 1141 is connected to conduit 832; and port 1135 is open to the sump 120.

D1 Drive Range Operation

The transmission mechanism of FIG. 2 is conditioned for automatic operation through five speed ranges by shifting the manual valve 139a into the D1 position. The unit 10a originally is in its gear reduction ratio and the front unit 10 is shifted through low, intermediate, and direct drive to obtain the first three speed ratios. For the fourth speed ratio, the rear unit 10a is shifted into direct drive and the front unit 10 is downshifted to intermediate speed drive. The fifth speed ratio is obtained subsequently by shifting the front unit back to the direct drive position. The various drive ratios are obtained by directing fluid pressure to the respective servomotor for the friction engaging elements set forth in Table II above.

With the manual valve 139a in the D1 position, line pressure from conduit 165 is supplied through ports 359, 360, and 361 into conduits 180, 181, and 182. Line pressure in conduit 180 is supplied to the servomotor 78 for engaging the front clutch 22, the one-way brake 25 is engaged for serving as a reaction member for the planetary gear set 19, and the front unit 10 is thus conditioned for low-speed forward drive. Line pressure in the conduit 180 is also supplied through restriction 1025 to the port 1021 of the auxiliary brake apply valve 805. This pressure is blocked initially by the land 1006, until the valve piston 996 is moved to the right against the action of the spring 998. Fluid pressure in conduit 180 is also supplied through the hold valve 150 by way of ports 610, groove 607, and port 611 into the conduit 818 to the 4–5 shift valve 804. Fluid pressure in conduit 818 passes through port 977, groove 971 and port 978 into conduit 821 to the 3–4 shift valve 802. From conduit 821 fluid passes through port 950, groove 943 and port 951 into conduit 825. From conduit 825 fluid passes to the D2 range valve 807 and through port 1077, groove 1070, and port 1078 into conduit 831. From conduit 831 fluid passes through port 1140, groove 1130, and port 1139 into conduit 830; from conduit 830 fluid passes through port 1010 and groove 1001 of the reverse brake apply valve 895 to port 1011, channel 1023 and port 1013 into the bore 991 where it acts against the left end of the valve plug 994. This pressure is effective to move the plugs 994 and 995 and piston 996 to the right against the action of the spring 998 for opening the port 1021. Fluid from the port 1021 then flows through the groove 1008, port 1020 and conduit 813 to the reverse apply valve 145a. From the conduit 813, fluid flows through port 840, groove 837, and port 839 into conduit 812 and to the brake apply cavity 106 for engaging the brake 91. This places the rear unit 10a into its reduction gear ratio and renders the first speed drive train effective through the entire transmission.

Pressure in the conduit 812 is also supplied to the right end of the auxiliary clutch apply valve 806, through port 1054 where it augments the action of the spring 1037 and insures that the valve piston 1036 is not shifted from its illustrated position.

When the vehicle speed increases, governor pressure from the governor 27a is supplied through conduit 200 to the governor control valve 800. Fluid pressure in the conduit 200 is supplied through port 864 into the bore 851 where it augments the action of the spring 853 tending to force the valve piston 852 to the left. Line pressure in conduit 165 is supplied through port 860 where it flows through the groove 857 and port 861 into conduit 200a. From conduit 200a it is supplied through restriction 865 and port 859 into the left end of the bore 851 where it acts against the valve piston 852 and tends to force it to the right against the action of the spring 853 and governor pressure. The pressure obtained in conduit 200a thus is a regulated pressure, normally less than line pressure, that varies directly as a function of governor pressure, but is of substantially larger magnitude.

Pressure in conduit 200a is supplied to the left ends of the 1–2 shift valve 801 and the 2–3 shift valve 802. When this pressure reaches a sufficient magnitude, the valve piston 872 is moved to the right against the action of spring 873 and bias forces supplied by throttle pressure and line pressure.

In the condition previously described for obtaining first speed forward drive, line pressure is present in conduit 831. This pressure is supplied through port 1137 of the downshift sequence valve 809 and groove 1129 and port 1136 into the conduit 828. From conduit 828 fluid under pressure is supplied through port 917, groove 911, and port 913 into conduit 826. When the 1–2 shift valve 801 is moved to the right, fluid pressure from conduit 826 flows from port 887, through groove 880 into port 886 and conduit 816. From conduit 816 fluid pressure is supplied through port 632 to the left end of the front brake apply valve 151a and the front brake 21 is applied as previously described for completing intermediate speed drive in the front unit. The condition of the rear auxiliary brake 91 remains unchanged.

As governor pressure continues to increase with increasing vehicle speed, a point is reached at which the shift from intermediate to direct drive in the front unit occurs and a 2–3 shift is obtained. To obtain this condition, governor pressure acting on the left end of the 2–3 shift valve piston 902 is sufficient to force it to the right against the combined action of spring 903 and bias forces exerted by throttle pressure and line pressure. When the valve piston 902 has been moved to the right, line pressure present in conduit 828 is directed through port 917, groove 910, and port 916 into conduit 827. From the conduit 827 fluid flows through port 1134 of the downshift sequence valve 809, groove 1128, and port 1133 into conduit 814 where it is supplied to the left end of the rear clutch apply valve 152a. This valve 152a is effective to engage the rear clutch 23 for completing direct drive through the front transmission unit, as previously described. The rear auxiliary brake 91 remains engaged, thereby completing the third speed forward drive condition through the transmission.

An upshift to fourth speed forward drive is obtained by engaging the auxiliary clutch 92 and downshifting the front transmission unit to its intermediate speed condition. It is important that the upshift of the auxiliary unit 10a occur prior to the downshift of the front unit so as to prevent apparent engine run-away.

As governor pressure continues to increase with increasing vehicle speed, a point is reached at which the force on the left end of the 3–4 shift valve piston 932 is sufficient to shift it to the right into its fourth-speed position. Line pressure present in the conduit 818 flows through the 4–5 shift valve 804 and conduit 821 to the 3–4 shift valve 803. This pressure exists at the port 950, and when the valve piston 932 is shifted, this pressure is supplied through the groove 942 and port 949, into conduit 824. From conduit 824 fluid is supplied to port 1104 of the upshift sequence valve 808 and through port 1043 into the left end of the auxiliary clutch apply valve 806. Fluid pressure at port 1104 is blocked initially by the land 1095. Line pressure in conduit 180 is supplied through port 1111 and forces the valve piston 1092 to the left against the action of the spring 1093.

Line pressure supplied to the left end of the auxiliary clutch apply valve 806 is effective to shift the valve plugs 1032, 1033, 1034 and 1035 and the valve piston 1036 to the rght so that the land 1040 unblocks the port 1053. Line pressure is then supplied from conduit 180 through port 1053, groove 1042, and port 1052 into conduit 829 and to the auxiliary clutch apply cavity 116 for engaging the auxiliary clutch 92. The pressure in conduit 829 is also supplied to port 1022 of the auxiliary brake apply valve 805 where it enters the bore 901 and forces the valve piston 996 to the left. The port 1021 is blocked and the auxiliary brake apply cavity 106 is exhausted by way of conduit 812, reverse apply valve 145a, conduit 813, port 1020, groove 1008 and port 1019 into the sump 120. The engagement of the auxiliary clutch 92 and disengagement of the brake 91 is thus obtained with a controlled overlap so that engine torque is transmitted at all times.

Pressure in conduit 829 is also supplied through port 1101 of the upshift sequence valve 808 where it acts on the left end of the valve piston 1092 and augments the action of the spring 1093 in forcing the piston 1092 to the right. This movement opens the port 1104 and permits the application of line pressure through port 1104, groove 1098, port 1103 and conduit 817 to port 633 of the front brake apply valve 151a. The valve 151a is effective to apply the front brake for completing the intermediate speed power train through the front unit as previously described. The transmission mechanism has thus been conditioned for fourth-speed forward drive.

A subsequent upshift to fifth-speed occurs when governor pressure acting on the left end of the 4–5 shift valve piston 962 is sufficient to move it to the right. When the valve piston 962 has been moved to the upshifted position, line pressure from conduit 818 is supplied by way of port 977, groove 970 and port 976 into conduit 822. Line pressure in conduit 822 is supplied through the upshift sequence valve 808 by way of port 1107, groove 1099, port 1106, and conduit 815 to the rear clutch apply valve 152a. The rear clutch apply valve 152a is effective to engage the rear clutch 23 of the front unit for thereby completing a direct drive power train in the front unit and establishing a fifth speed forward drive through the transmisison. Pressure in the conduit 822 is also supplied through port 1044 of the auxiliary clutch apply valve 806 for maintaining the valve 806 in an upshifted condition. This latter provision is necessary since line pressure previously supplied through conduits 821 and 824 has been cut off by the upshift of the 4–5 shift valve 804.

A downshift from fifth-speed ratio to fourth-speed ratio occurs in the reverse manner from that just described. The downshift from fourth speed to third speed, however, requires that the front unit be upshifted while the auxiliary unit 10a is downshifted into its reduction ratio. The front unit is upshifted by engagement of the rear clutch 23 and disengagement of the front brake 21 prior to the downshift of the auxiliary unit wherein the auxiliary brake 91 is engaged and the auxiliary clutch 92 is disengaged. The downshift valve 809 insures that the shifts take place in this order as will now be described.

When the vehicle speed decreases sufficiently and governor pressure reaches a point at which the 3–4 shift valve piston 932 is moved to the left, line pressure from conduit 821 is supplied through port 950, groove 943, port 951 and conduit 825 to port 1077 of the D2 range valve 807. Fluid passes through the groove 1070, port 1078 and conduit 831 to port 110 of the upshift sequence valve 808. From the port 1110 fluid pressure passes through the groove 1100, port 1109 and conduit 832, then to port 1141 of the downshift sequence valve 809. Pressure acting on the right end of valve piston 1122 is effective to force it to the left against the action of the spring 1123. Pressure in conduit 831 was blocked initially at the port 1132 of the downshift sequence valve 809. When the valve piston 1122 has been moved to the left, the port 1132 is opened and fluid passes through the groove 1128 and port 1133 into conduit 814 and then to port 662 of the rear clutch apply valve 152a. The rear clutch apply valve 152a causes the rear clutch 23 to be engaged as previously described. As the pressure in the rear clutch cavity 85 builds up, the pressure in the conduit 196 builds up correspondingly and this pressure is supplied through the reverse apply valve 145a by way of conduits 196 and 195 to port 1138 to the downshift sequence valve 809. From the port 1138, which is now unblocked, fluid pressure passes through the groove 1130, port 1139 and conduit 830 to port 1010 of the auxiliary brake apply valve 805. Fluid passes from conduit 830 through the groove 1001, port 1011, channel 1023, and port 1013 into the bore 991 where it acts against the plug 994 and forces the valve piston 996 to the right for engaging the auxiliary brake 91 as previously described.

When the auxiliary apply valve piston 996 has been moved to the right, the port 1021 is unblocked and line pressure from conduit 180 is supplied through the groove 1008, port 1020 and conduit 813 to port 1131 where it enters the bore 1121 and augments the action of the spring 1123 in forcing the valve piston 1122 back to the right. When the downshift sequence valve piston 1122 has been shifted to the right, pressure from the rear clutch conduit 195 is cut off by the land 1126, but this pressure is replaced by pressure supplied from conduit 831 through port 1140, groove 1130, and port 1139 into the conduit 830. This insures that the auxiliary brake apply valve piston 996 remains in its position to the right. Similarly, when the downshift sequence valve piston 1122 is moved to the right, pressure at the port 1132, which had been supplied through conduit 814 to the rear clutch apply valve 152a, is cut off by the land 1124. This pressure is replaced, however, by pressure supplied from conduit 831 through port 1137, groove 1129, port 1136, and conduit 828 through the 2–3 shift valve 802 by way of port 917, grove 910, port 916, and conduit 827 back to port 1134 of the downshift sequence valve 809. Fluid from the port 1134 is supplied through the groove 1128, port 1133, and conduit 814 to port 662 of the rear clutch apply valve 152a for insuring that the rear clutch 23 remains engaged. This latter pressure is cut off by the 2–3 shift valve 802, however, when a downshift from third-speed forward drive to second occurs. The downshift from third to second and from second to first occurs in the reverse order from that previously described.

*D2 Drive Range Operation*

The transmission mechanism is conditioned for providing three forward speed ratios in automatic operation by shifting the manual valve 139a into the D2 position.

For this condition, the auxiliary clutch 92 remains engaged at all times and the front unit shifts through its normal three ratios. With the manual valve 139a in the D2 position, line pressure from conduit 165 is supplied through port 358 and conduit 810 to port 1071 of the D2 range valve 807. Pressure in the conduit 810 is also supplied to the left end of the auxiliary brake apply valve 805 and to the port 1045 of the auxiliary clutch apply valve 806. Pressure supplied through the port 1045 is effective to shift the auxiliary clutch apply valve piston 1036 for engaging the auxiliary clutch 92 as previously described. Pressure supplied to port 1009 of the auxiliary brake apply valve 805 is effective to move the valve piston 992 to the right against the action of spring 997 so that the land 999 blocks the port 1010 and prevents the application of pressure to the valve piston 996 and thus ensures that the rear brake 91 cannot be engaged.

Movement of the D2 range valve piston 1062 to the right causes land 1064 to block the port 1072 and the land 1067 to unblock the port 1079 so that the conduit 831 is permitted to drain to the sump. Line pressure present in conduit 825 is supplied through port 1077, groove 1069, port 1076, and conduit 820 to port 590 of the rear brake apply valve 149a. Fluid pressure supplied through the port 590 is effective to move the plug 583 and piston 584 to the right and low-speed drive condition is obtained as previously described. Line pressure from the conduit 180 is supplied through the rear brake apply valve 149a into conduit 190. From conduit 190 fluid pressure is supplied through the front brake gate valve 155 into conduit 208 and to the right end of the front brake apply valve 151a, and through the rear clutch gate valve 154 into conduit 209 and to the right end of the rear clutch apply valve 152a to insure that these two apply valves remain in a disapply condition.

The governor valve 27a provides a pressure that increases directly with vehicle speed that is the same for either the D1 or D2 condition. Some provision must be made to correct for the difference in third speed gear ratio for these two conditions. The D2 range valve 807 effectively modifies governor pressure in the following manner:

When the D2 range valve piston 1062 is in its illustrated position, governor pressure is supplied from conduit 200 through port 1072, groove 1068, and port 1073 into conduit 823 and then to port 946 of the 3–4 shift valve 803. Pressure supplied through the port 946 acts upon the differential area between lands 934 and 935 and tends to counteract the force due to governor pressure acting on the left end of the valve piston 932. In the D2 range condition, however, the D2 range valve piston 1062 is moved to the right and the land 1064 blocks governor pressure at the port 1072 and prevents the application of governor pressure on the differential areas of lands 934 and 935. This provision effectively corrects for the difference in governor pressure due to the differences in the three speed gear ratio in the D1 and D2 conditions.

Hold condition and inhibited low-speed drive condition are obtained in substantially the same manner as that described for the transmission of FIGURE 1.

*Reverse Drive Condition*

Reverse drive condition is also obtained in substantially the same manner except for the provision for engagement of the auxiliary brake 91. When the manual valve 139a is shifted into the "R" position, line pressure is supplied through port 836 and conduit 811 to port 838 of the reverse apply valve 145a where it is blocked initially by the land 484. Line pressure supplied through port 835 of the manual valve into conduit 183 is transmitted through the reverse inhibitor valve 146 and conduit 198 to the right end of the reverse apply valve 145a for moving the valve piston 482a to the left, thereby opening the port 838. Line pressure is then permitted to flow from conduit 811 through port 838, groove 837 and port 839 into conduit 812 for engaging the auxiliary brake 91. Line pressure is also supplied from conduit 183 through the valve 145a and conduit 196 to the rear clutch apply cavity 85 for engaging the rear clutch 23. Line pressure in the conduit 183 is also supplied through reverse apply valve 145a and conduit 197 to the servo 87 for engaging the rear brake 24. The transmission mechanism is then conditioned for reverse operation.

*Power Take-Off Operation*

The power-take-off condition is obtained by utilizing the gear 93 of the auxiliary unit 10a when the vehicle is at rest, and with both the auxiliary brake 91 and the auxiliary clutch 92 disengaged. The power take-off condition is obtained by shifting the manual selector valve 139a into the "PTO" position. In this position, the land 354 cuts off line pressure from the port 836 and permits the conduit 811 to drain into sump 120. This insures that no fluid pressure is supplied to the auxiliary brake apply cavity 106; consequently, no torque is transmitted to the output shaft 94.

Line pressure fluid is still supplied through port 835 to conduit 183 and to the front transmission unit for conditioning it for reverse drive as previously described. Driving torque from the vehicle engine, therefore, is reversed by the front transmission unit and transmitted through the intermediate shaft 12a and planet gear carrier 99 to the gear 93 for driving the power take-off device.

I claim:

1. In a transmission mechanism providing a plurality of driving gear ratios, a plurality of hydraulically operated servomotors connected to said transmission mechanism for completing any one of said plurality of driving gear ratios through the transmission, a source of fluid pressure for supplying fluid to the servomotors, shift valve means connected between said source of fluid pressure and said servomotors for directing fluid from said source to various ones of the servomotors for completing one of the driving gear ratios through the transmission, hold valve means hydraulically interconnected with said shift valve means and effective thereon when actuated to prevent a change in driving gear ratio, and a manually operated valve interconnected with said source and said hold valve means and having a selective hold position, said hold valve being effective to prevent a change in the driving gear ratio irrespective of which forward gear ratio of said plurality of gear ratios is being utilized when said manual valve is moved into said hold position.

2. In a transmission mechanism providing a plurality of driving gear ratios, a plurality of friction engaging elements connected to said transmission mechanism, a plurality of hydraulically operated servomotors connected to said friction engaging elements to actuate certain of said friction engaging elements for completing any one of a plurality of power trains through the transmission, a hydraulic retarder interconnected with the transmission mechanism and adapted to absorb energy therefrom, a source of fluid pressure connected to supply fluid to the servomotors and to the retarder, shift valve means connected between said source of fluid pressure and said servomotors for directing fluid from said source to various ones of the servomotors for completing the driving gear ratios through the transmission, manually operated valve means connected between said source and said retarder for directing fluid from said source to said retarder, and additional valve means hydraulically interconnected with said shift valve means and with said manually operated valve means and effective when actuated to prevent said shift valve means from directing fluid to other servomotors and thereby prevent a change in the gear ratio irrespective of which forward gear ratio of said plurality of gear ratios is being utilized at the time that said manually operated valve means is actuated.

3. In a transmission mechanism providing a plurality of driving gear ratios, a plurality of hydraulically operated servomotors connected to said transmission mechanism for completing any one of said plurality of driving gear ratios through the transmission, a source of fluid pressure connected to supply fluid to said servomotors, a pressure regulating valve interconnected with said source and effective to regulate the output pressure therefrom, a plurality of shift valve means connected to direct fluid from said source to various ones of the servomotors for completing one of the driving gear ratios through the transmission, and hold valve means hydraulically interconnected with said shift valve means and with said pressure regulating valve, a manually operated valve interconnected with said source and said hold valve, said hold valve means being effective when actuated by said manual valve to control the flow of fluid to said shift valve means so as to prevent a change in the driving gear ratio being utilized at that time and also being effective to control the flow of fluid to said pressure regulating valve so as to cause it to regulate the pressure from said source to a maximum value.

4. In a transmission mechanism providing a plurality of driving gear ratios, a plurality of hydraulically operated servomotors connected to said transmission mechanism for completing any one of a plurality of driving gear ratios through the transmission, a source of fluid pressure for supplying fluid to the servomotors, an apply valve for one of the servomotors connected to said source and to said one servomotor and effective in one position to direct fluid pressure to the servomotor for energizing it and in a second position to cut off the fluid from the servomotor for deenergizing it, said apply valve including a valve piston formed with a differential area responsive to fluid pressure from said source and effective to hold the piston in said one position, shift valve means interconnected with said source and with said apply valve and effective to supply fluid pressure to said apply valve for moving it to said one position, additional shift valve means interconnected with said source and with said apply valve and effective to supply fluid pressure to said apply valve for moving it to said second position, and means responsive to the operative condition of the transmission mechanism for actuating said shift valve means.

5. In the transmission mechanism providing a plurality of driving gear ratios, a plurality of fluid pressure operated servomotors connected to said transmission mechanism for completing a plurality of power trains through the transmission, a source of fluid pressure for supplying fluid to the servomotors, an apply valve for each of the servomotors interconnected between said source and the respective servomotor and including a movable valve piston effective in one position to direct fluid pressure from said source to the servomotor and effective in a second position to cut off fluid from the servomotor, shift valve means interconnected with said source and with said apply valves and effective to supply signal pressures thereto for moving said apply valve pistons to one or the other of said positions, a hold valve interconnected with said source and with said shift valve means and effective when actuated to prevent said shift valves from supplying said signal pressures to said apply valves, and said apply valve pistons being formed with an area responsive to fluid pressure supplied from said source whereby said apply valves and said respective servomotors are maintained in their respective condition at the time said hold valve is actuated.

6. A transmission mechanism providing a plurality of driving gear ratios, a plurality of fluid pressure actuated servomotors connected to said transmission mechanism for completing any one of a plurality of driving gear ratios through the transmission and adapted for use in an automotive vehicle having an engine with a throttle and a throttle actuator, a source of fluid pressure for supplying fluid to the servomotors, an apply valve for each of the servomotors interconnected with said source and having a first operative condition wherein fluid pressure is directed to the servomotor for energizing it and a second operative position wherein fluid pressure to the servomotor is cut off, shift valve means interconnected with said source and effective to supply signal pressures to said apply valves for establishing one or the other of said conditions, means connected to said shift valve means and responsive to the operative condition of the transmission mechanism for actuating said shift valve means, and throttle actuator responsive valve means interconnected with said source and with said throttle actuator and connected to supply a bias pressure to said apply valves that varies with the throttle actuated position whereby the transition of said apply valves from one condition to the other is modified as a function of throttle actuator position.

7. In a transmission mechanism providing a plurality of driving gear ratios, a plurality of fluid pressure actuated servomotors connected to said transmission mechanism for establishing the various driving gear ratios through the transmission, a source of fluid pressure for supplying fluid to the servomotors, a hydraulic retarder interconnected with said gearing and having a fluid cavity connected to said source and adapted to be filled with fluid from said source, manually operated valve means connected between said source and said retarder for directing fluid from said source to fill the retarder cavity, means defining a restriction in the connection between said retarder cavity and said source for limiting the rate of flow of fluid into the retarder cavity, and valve means in the connection between said source and said retarder cavity responsive to fluid pressure developed within said retarder cavity and effective when actuated to bypass said restriction means when some predetermined pressure is obtained and thereafter permitting substantially unrestricted flow of fluid from said source through said retarder.

8. A transmission mechanism providing a plurality of driving gear ratios, a plurality of fluid pressure actuated servomotors connected to said transmission mechanism for establishing the various driving gear ratios through the transmission, a source of fluid pressure for supplying fluid to the servomotors, a fluid retarder having a fluid cavity and interconnected with the gearing and adapted to absorb energy therefrom, a manually operated valve interconnected with said source and with said retarder cavity for directing fluid thereto, means defining a restriction in the connecton between said source and said manual valve for limiting a rate of flow of fluid into the retarder cavity so as to limit the drop in the fluid pressure supplied to the servomotors, a fluid cooler interconnected with said source and with said retarder cavity, and additional valve means interconnected with said source and said retarder cavity and responsive to the fluid pressure developed in the retarder cavity and effective when actuated to bypass said restriction means and thereafter permit relatively unrestricted fluid flow through said retarder and through said cooler.

9. In a transmission mechanism adapted for use in an automotive vehicle, a first gear set capable of establishing a relatively low speed gear ratio and a relatively high speed gear ratio, a second gear set interconnected with said first gear set and capable of establishing a relatively low speed gear ratio and a relatively high speed gear ratio, the ratio step of said second gear set being relatively greater than the ratio step of said first gear set, fluid pressure actuated servomotors connected to said gear sets and effective on said gear sets for establishing each of said named driving gear ratios, a source of fluid pressure connected to supply fluid to said servomotors, shift valve means interconnected with said source and with said servomotors and responsive to operative conditions of the vehicle for directing fluid to said respective servomotors for causing an upshift to said high speed ratio in said first gear set, upshift sequence valve means interconnected between said shift valve means and said servomotors and operable to direct the flow of fluid from said source to said respective servomotors so as to cause an upshift from said low speed ratio to said high speed ratio in said second gear set and upon completion of the upshift in said second gear set to cause a downshift in said first gear set, said shift valve means also being responsive to operative conditions of the vehicle for causing a downshift to said low speed ratio in said first gear set, and downshift sequence valve means interconnected between said shift valve means and said servomotors and operable to direct the flow of fluid from said source to certain of said servomotors so as to cause an upshift from said low speed ratio to said high speed ratio in said first gear set and upon completion of the upshift to cause a downshift in said second gear set.

10. In a transmission mechanism providing a plurality of driving gear ratios, a plurality of fluid pressure actuated servomotors connected to said transmission mechanism for establishing the various driving gear ratios through the transmission, a source of fluid pressure for supplying fluid to the servomotors, a plurality of shift valves connected between said source and said servomotors, said shift valves each having an upshifted position and a downshifted position and being effective to cause the application of one or more of said servomotors for either establishing the higher speed ratio or the lower speed ratio, said shift valves being connected in series to said fluid source in the order of decreasing speed ratio or increasing gear ratio, and said shift valves controlling the higher speed ratios being effective to cut off fluid pressure to all of said shift valves controlling the lower speed ratios and thereby prevent the engagement of more than one driving gear ratio through the transmission at one time.

11. In a transmission mechanism adapted for use in an automotive vehicle, a first gear set capable of establishing a relatively low speed gear ratio and a relatively high speed gear ratio, a second gear set interconnected with said first gear set and capable of establishing a relatively low speed gear ratio and a relatively high speed gear ratio, the ratio step of said second gear set being relatively greater than the ratio step of said first gear set, fluid pressure actuated servomotors connected to said gear sets for establishing each of said named driving gear ratios, a source of fluid pressure connected to supply fluid to said servomotors, shift valve means interconnected with said source and with said servomotors and responsive to operative conditions of the vehicle for directing fluid to said respective servomotors for causing a downshift to said low speed ratio in said first gear set, and downshift sequence valve means interconnected between said shift valve means and said servomotors and operable to direct the flow of fluid from said source to said respective servomotors so as to cause an upshift from said low speed ratio to said high speed ratio in said first gear set and upon completion of the upshift to cause a downshift in said second gear set.

References Cited in the file of this patent
UNITED STATES PATENTS

| | | |
|---|---|---|
| 2,950,629 | Holdeman | Aug. 30, 1960 |
| 3,004,446 | Flinn | Oct. 17, 1961 |
| 3,014,383 | Flinn | Dec. 26, 1961 |
| 3,078,736 | Meads et al. | Feb. 26, 1963 |

UNITED STATES PATENT OFFICE
CERTIFICATE OF CORRECTION

Patent No. 3,146,630                                       September 1, 1964

John S. Ivey

It is hereby certified that error appears in the above numbered patent requiring correction and that the said Letters Patent should read as corrected below.

Column 4, line 46, for "planetary" read -- planet --; column 5, line 39, for "drum 101" read -- drum 100 --; column 8, line 31, for "26" read -- 226 --; column 17, line 57, after "valve" insert -- 148 --; column 19, line 63, for "hereby" read -- thereby --; column 26, line 29, for "annuar" read -- annular --; column 27, line 30, for "140" read -- 1140 --; column 30, line 15, for "110" read -- 1110 --.

Signed and sealed this 9th day of March 1965.

(SEAL)
Attest:

ERNEST W. SWIDER                                             EDWARD J. BRENNER
Attesting Officer                                                Commissioner of Patents